US009497670B2

(12) United States Patent
Lee et al.

(10) Patent No.: US 9,497,670 B2
(45) Date of Patent: Nov. 15, 2016

(54) METHOD AND DEVICE FOR MOBILITY MANAGEMENT OF MOBILE STATION IN MOBILE COMMUNICATIONS SYSTEM

(75) Inventors: Jinsock Lee, Tokyo (JP); Kojiro Hamabe, Tokyo (JP)

(73) Assignee: NEC Corporation, Tokyo (JP)

( * ) Notice: Subject to any disclaimer, the term of this patent is extended or adjusted under 35 U.S.C. 154(b) by 1111 days.

(21) Appl. No.: 11/931,427

(22) Filed: Oct. 31, 2007

(65) Prior Publication Data

US 2008/0108353 A1    May 8, 2008

(30) Foreign Application Priority Data

Nov. 3, 2006 (JP) ................................. 2006-299726

(51) Int. Cl.
*H04W 36/00* (2009.01)
*H04J 11/00* (2006.01)

(52) U.S. Cl.
CPC ...... *H04W 36/0061* (2013.01); *H04J 11/0093* (2013.01)

(58) Field of Classification Search
CPC ................................................ H04W 36/0061
USPC .................................................. 455/436–445
See application file for complete search history.

(56) References Cited

U.S. PATENT DOCUMENTS

| 5,353,332 | A | 10/1994 | Raith et al. |
| 6,201,968 | B1 | 3/2001 | Ostroff et al. |
| 6,442,395 | B1 * | 8/2002 | Refai et al. ..................... 455/510 |
| 6,667,962 | B1 * | 12/2003 | Lee et al. ........................ 370/335 |
| 2004/0121773 | A1 * | 6/2004 | O'Brien ........................ 455/438 |
| 2004/0157608 | A1 * | 8/2004 | Kurose et al. ................. 455/436 |
| 2005/0113117 | A1 * | 5/2005 | Bolin ..................... H04W 64/00 455/456.6 |

FOREIGN PATENT DOCUMENTS

| GB | 2 331 892 A | 6/1999 |
| JP | 2001-526016 A | 12/2001 |
| JP | 2004-242139 A | 8/2004 |
| JP | 2005-333648 A | 12/2005 |
| WO | WO-99/02004 A1 | 1/1999 |
| WO | WO-00/36858 A2 | 6/2000 |

OTHER PUBLICATIONS

3GPP TR 25.813 V7.1.0 (Sep. 2006); Technical Report; 3rd Generation Partnership Project; Technical Specification Group Radio Access Network; Evolved Universal Terrestrial Radio Access (E-UTRA) and Evolved Universal Terrestrial Radio Access Network (E-UTRAN); Radio interface protocol aspects (Release 7).
(Continued)

*Primary Examiner* — Kent Chang
*Assistant Examiner* — Chayce Bibbee
(74) *Attorney, Agent, or Firm* — Arent Fox LLP

(57) ABSTRACT

A method and an apparatus for mobility management of a mobile station that can efficiently avoid interruption of services to the mobile station, without imposing loads on a network and the mobile station, are provided. Upon change of serving cell, a mobile station receives a neighbor list from a new serving cell and stores it in a neighbor list (NL-NW). Upon cell selection, the mobile station associates the new serving cell with the previous serving cell and stores information about this association in a neighbor list (NL-A). Upon detection of deterioration in the quality of the current serving cell, the mobile station measures the quality of each cell on the neighbor list (NL-NW) and the neighbor list (NL-A). Upon detection of a cell that is better than the current serving cell, the mobile station reselects this detected better cell as its new serving cell.

31 Claims, 13 Drawing Sheets

(56) References Cited

OTHER PUBLICATIONS

3GPP TS 25.133 V6.15.0 (Oct. 2006); Technical Specification; 3rd Generation Partnership Project; Technical Specification Group Radio Access Network; Requirements for support of radio resource management (FDD) (Release 6).

3GPP TS 25.331 V6.9.0 (Mar. 2006); Radio Resource Control (RRC); Protocol Specification (Release 6).

3GPP TS 25.304 V6.9.0 (Mar. 2006); Technical Specification; 3rd Generation Partnership Project; Technical Specification Group Radio Access Network; User Equipment (UE) procedures in idle mode and procedures for cell reselection in connected mode (Release 6).

* cited by examiner

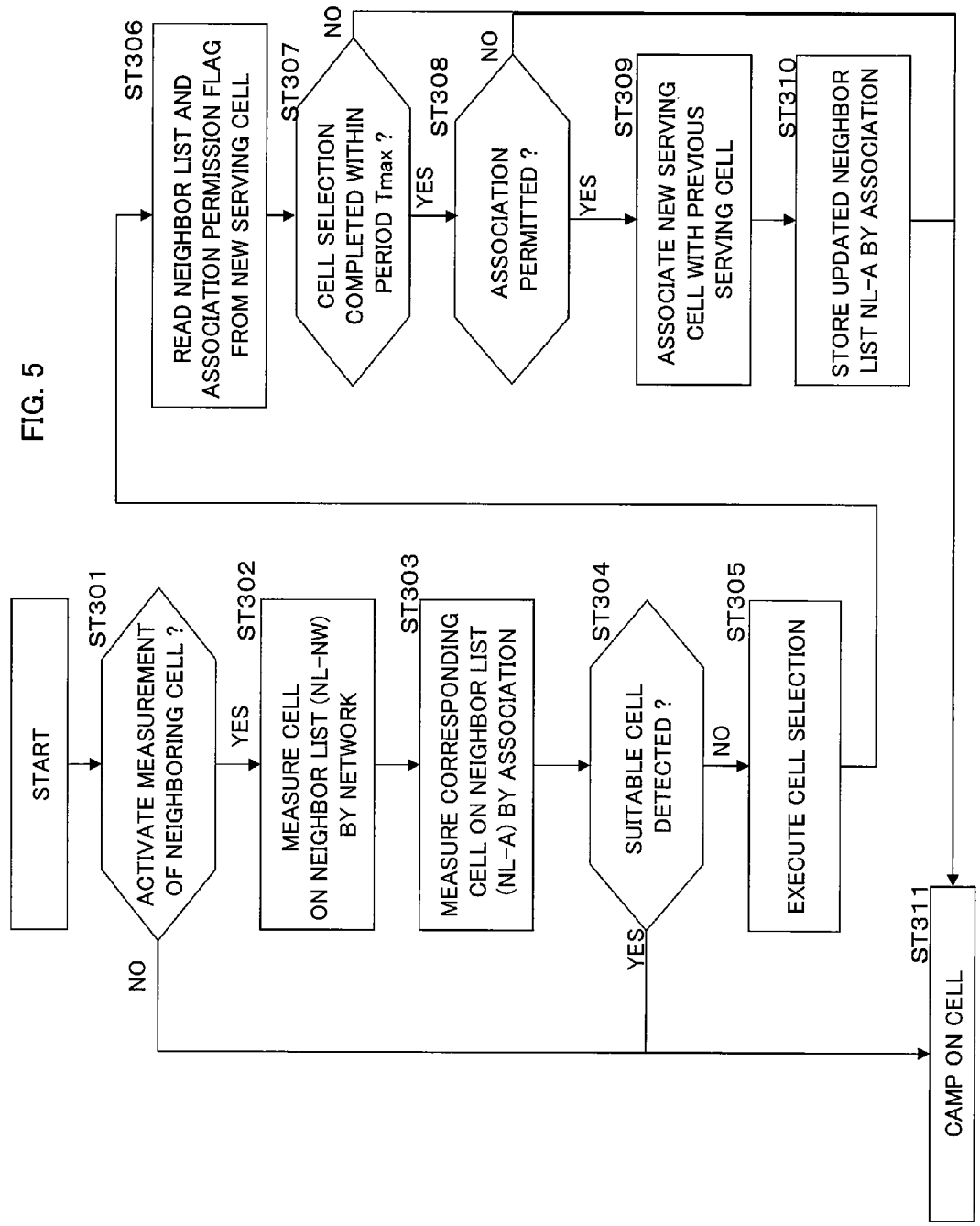

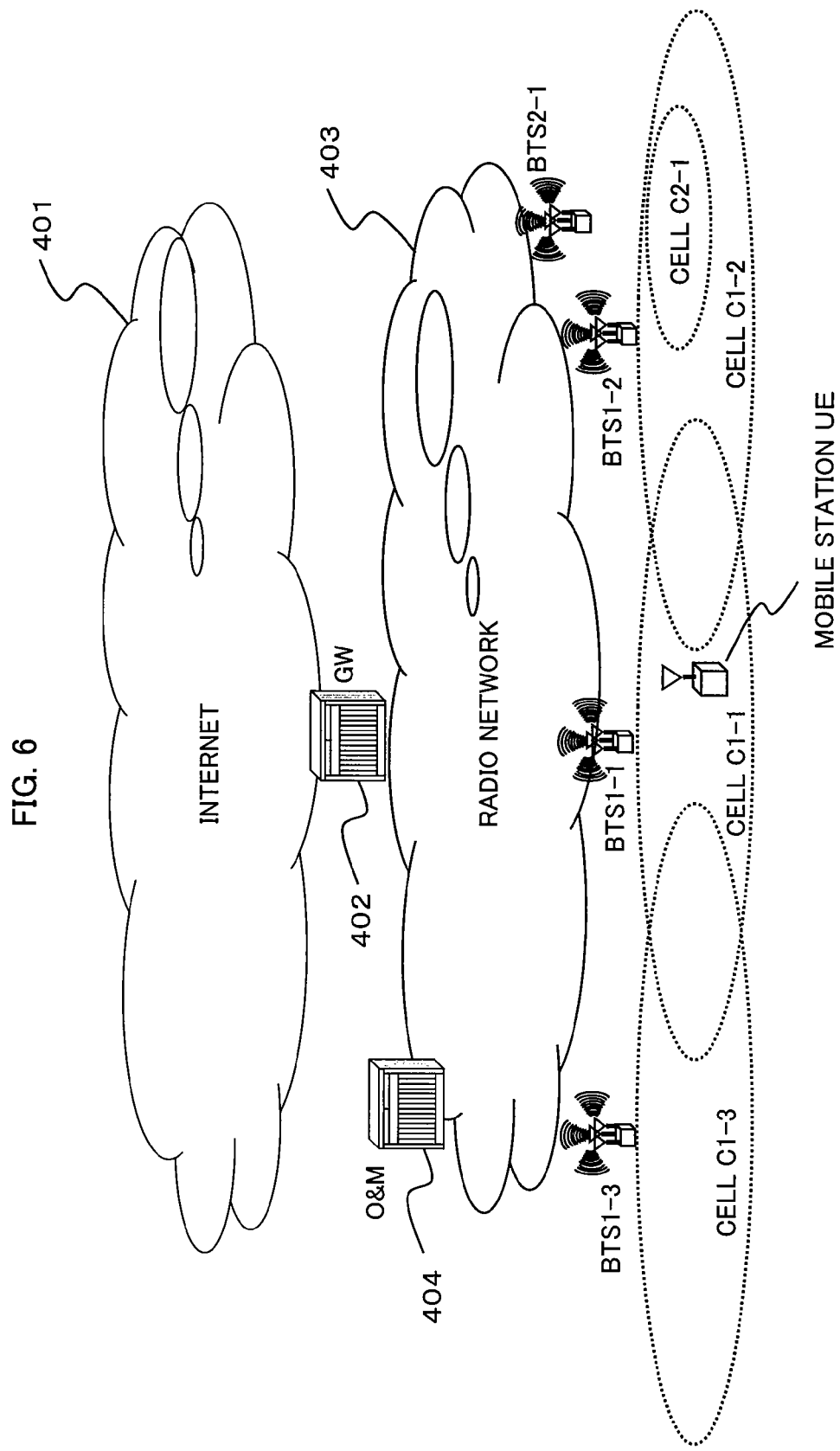

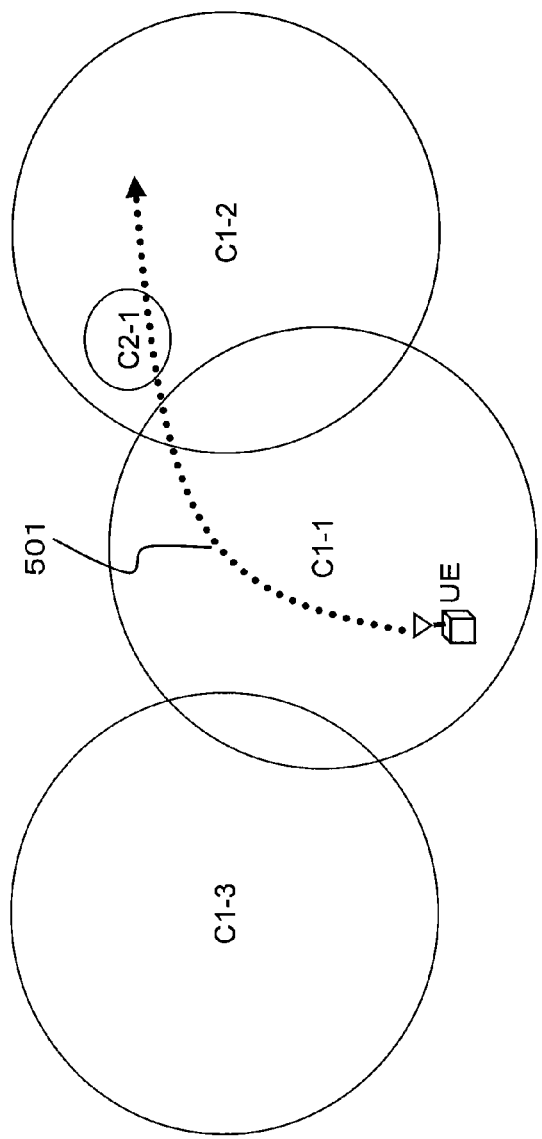

| INFORMATION MAINTAINED BY NETWORK | |
|---|---|
| CELL ID | NEIGHBOR LIST |
| C1-1 | {C1-2, C1-3} |
| C1-2 | {C1-1} |
| C1-3 | {C1-1} |
| C2-1 | {} |

| INFORMATION MAINTAINED BY UE | | |
|---|---|---|
| CELL ID | NEIGHBOR LIST (NL-A) BY ASSOCIATION | NEIGHBOR LIST (NL-NW) BY NETWORK |
| C1-1 | {} | {C1-2, C1-3} |
| C1-2 | {C2-1} | {C1-1} |
| C1-3 | {} | {C1-1} |
| C2-1 | {C1-2} | {} |

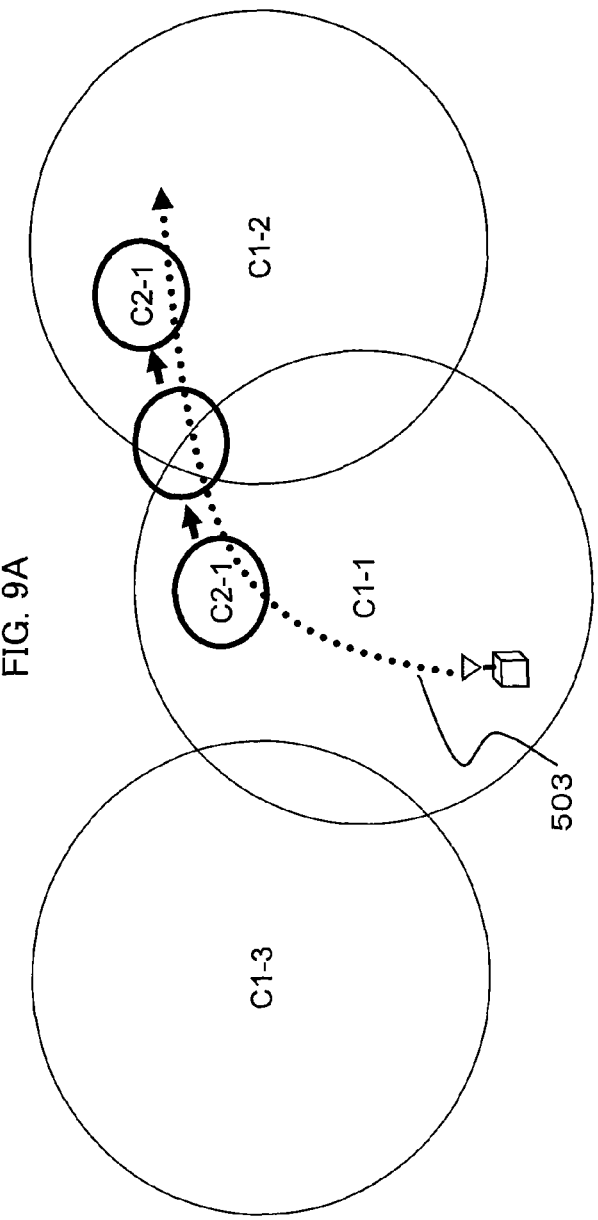

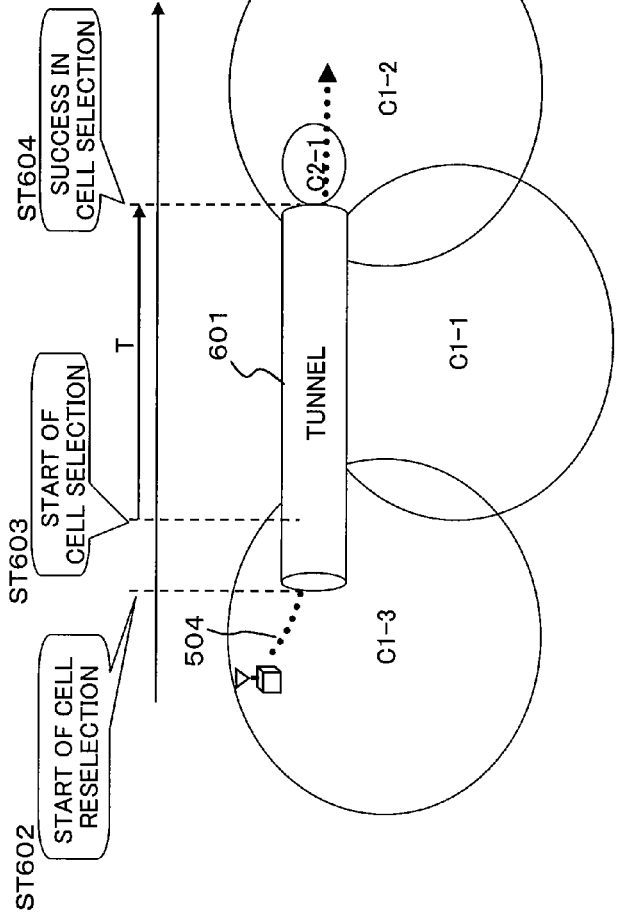

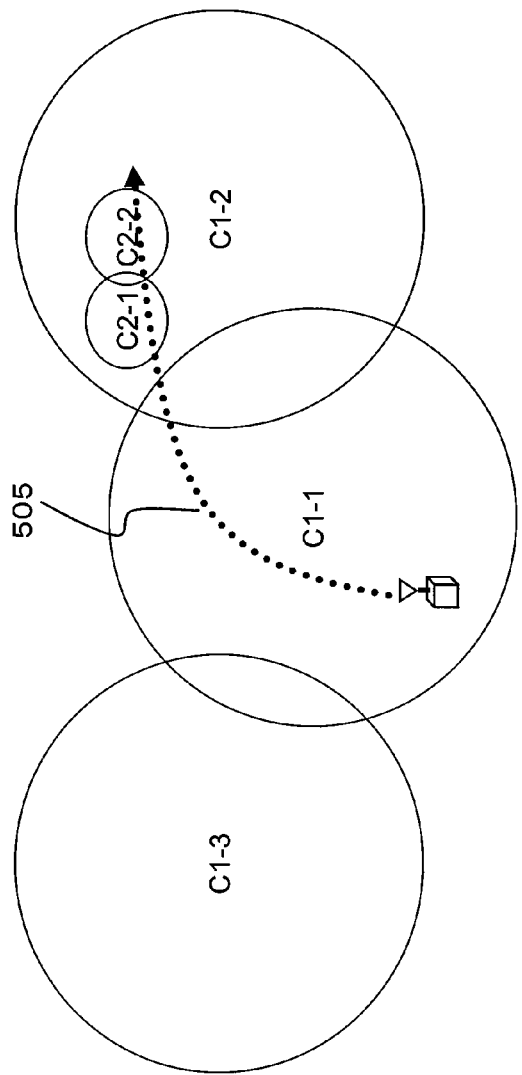

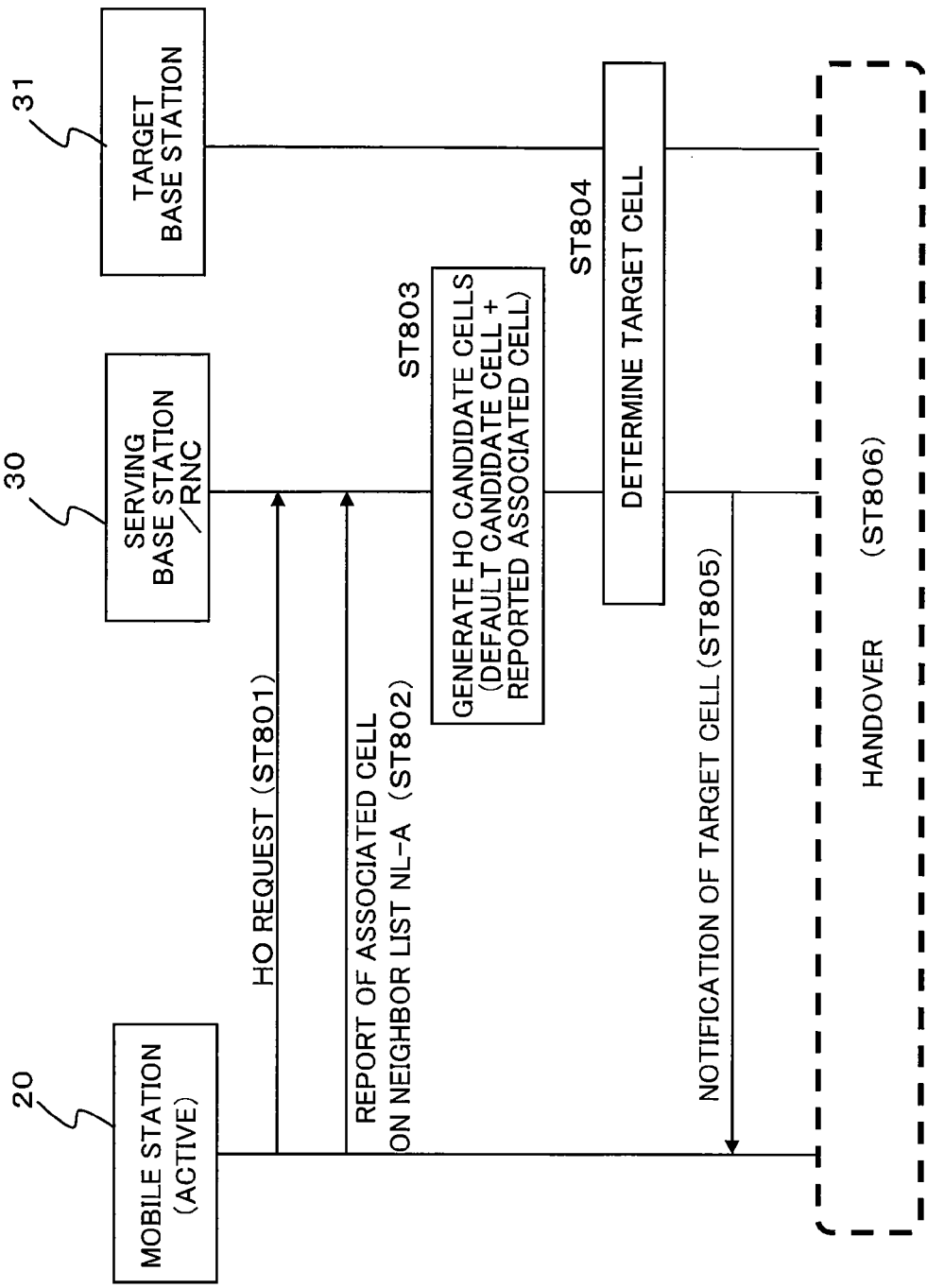

METHOD AND DEVICE FOR MOBILITY MANAGEMENT OF MOBILE STATION IN MOBILE COMMUNICATIONS SYSTEM

BACKGROUND OF THE INVENTION

1. Field of the Invention

This application is based upon and claims the benefit of priority from Japanese Patent Application No. 2006-299726, filed on Nov. 3, 2006, the disclosure of which is incorporated herein in its entirety by reference.

The present invention relates to a mobile communications system having a plurality of base stations which control a plurality of cells, respectively. More particularly, the present invention relates to a mobility management method and device for selecting a cell to which a mobile station is connected.

2. Description of the Related Art

In a cellular mobile communications system having a plurality of cells controlled by a plurality of base stations, a mobile station generally exchanges data or control signals with base stations, detects a cell suitable for the mobile station to receive normal services (hereinafter, such a cell will be referred to as "suitable cell"), and thereby can camp on that cell. In the case where the mobile station cannot select a suitable cell to camp on, the mobile station can also select and camp on a cell from which the mobile station can receive limited services (hereinafter, such a cell will be referred to as "acceptable cell"). "Camping on a cell" means that a mobile station in an idle mode connects to a cell detected through cell selection/cell reselection, which will be described later.

For example, in the UMTS (Universal Mobile Telecommunications System) system, a mobile station that has camped on a cell receives the ID of the cell, the ID of a tracking area, and an undermentioned neighbor list through a broadcast channel (BCCH) from the base station (serving base station) controlling this cell, and monitors a paging channel (PCH). The mobile station also monitors pilot channels (CPICH) from neighboring cells intermittently. Neighboring cell information contained in the neighbor list typically includes the carrier frequencies of the neighboring cells and other system parameters. Therefore, by referring to the neighbor list, the mobile station searches for a cell to camp on while tuning in to the carrier frequency of each neighboring cell, whereby the mobile station can receive a downlink broadcast channel.

Moreover, when the mobile station has detected, based on the neighbor list, a better cell (generally, a cell exhibiting better radio quality) than the cell (hereinafter, referred to as "serving cell") on which the mobile station is currently camping, then the mobile station camps on this newly detected cell as its serving cell. This operation is called "cell reselection". The cell reselection is performed by a mobile station, based on some criterion provided from the network side. For example, when the mobile station has detected deterioration in the radio quality of its current serving cell, and if this state of deterioration continues for a period of time or longer, which is set on a reselection timer, then the mobile station performs cell reselection by using the neighboring cell information in the neighbor list. The cell reselection is generally performed through the following procedure. Specifically, while sequentially setting a carrier frequency according to the neighboring cell information stored in the neighbor list, the mobile station checks whether or not a neighboring cell having better radio quality than that of the current serving cell is detected. When such a cell having better radio quality is detected, the mobile station selects and camps on this cell having better radio quality as its new serving cell. As described above, since it is sufficient for the mobile station to check and detect the radio qualities only of the neighboring cells stored in the neighbor list, it is possible to select a cell having better radio quality at high speed. Thus, it is also possible to receive a paging message from the network with good reception probability. Additionally, the neighbor list is also utilized to measure the radio qualities of the neighboring cells at the time of handover.

If the mobile station cannot detect a suitable cell from among the cells on the neighbor list provided from the network side, the mobile station starts carrier sequential search, by which all possible carrier frequencies are sequentially searched, to find a suitable cell to camp on. The detection of a suitable cell by means of this carrier sequential search is called "cell selection" in the UMTS system. The cell selection includes initial cell selection and stored-information cell selection. In the initial cell selection, the mobile station, in ignorance of any carrier frequency information in advance, sequentially searches all existing frequency bands, thereby detecting a suitable cell. In the stored-information cell selection, the mobile station, having stored information about carrier frequencies in advance, carries out carrier sequential search of the frequency bands limited by the information, thereby detecting a suitable cell. The initial cell selection requires, for example, approximately twenty seconds to be complete because all radio frequency bands are searched. On the other hand, the stored-information cell selection enables higher-speed detection of a suitable cell because carrier sequential search is carried out in limited frequency bands. For example, the carrier sequential search according to the initial cell selection is carried out in the case where user equipment is used through an operator that uses a different band from any one of the frequency bands indicated by the stored carrier frequency information, as in the case where user equipment is powered on in a foreign country.

In the cell selection, in any case, the mobile station carries out sequential search of carrier frequencies. Therefore, the cell selection generally requires a longer time than the cell reselection, and services are interrupted during this period of time. In addition, a battery, by which user equipment is driven in general, is exhausted sooner because the sequential search consumes much power.

Procedures for the cell selection and for the cell reselection in the UMTS system are described in the following documents:

3GPP TS 25.304 "User Equipment (mobile station) procedures in idle mode and procedures for cell reselection in connected mode";

3GPP TS 25.331 "Radio Resource Control (RRC); Protocol Specification (Release 6)"; and 3GPP TS 25.133 "Requirements for support of radio resource management (FDD)".

The neighbor list used in the cell reselection is sent to a mobile station from a base station on which the mobile station has camped. However, there is a possibility that not all cells are covered by the neighbor list, for example, in the case where a large number of small cells, called microcells or picocells, are deployed locally inside a building.

Japanese Patent Application Unexamined Publication No. 2001-526016 discloses a method by which a mobile station is allowed to connect to a suitable cell in a situation as described above where a cell that is not included in a neighbor list exists. Specifically, each base station in a neighborhood area transmits a single common list that includes all the measurement channels used in the neighborhood area. Thereby, a mobile station located in the neighborhood area can accomplish cell reselection using all the measurement channels.

In a mobile communications system provisioned with procedures for cell selection and cell reselection like the UMTS system, a mobile station performs cell selection when the mobile station moves into a cell that is not included in a neighbor list, because the mobile station cannot detect a suitable cell through cell reselection. In general, the mobile station performs stored-information cell selection and, if the mobile station cannot detect a suitable cell even through this stored-information cell selection, then performs initial cell selection. The larger the number of cells that are not included in a neighbor list as described above, the more frequently a mobile station performs cell selection. Accordingly, the problems arise that services are interrupted during cell selection, and that the power consumption is increased. Hereinafter, concerning these problems, a description will be given by using the accompanied drawings.

FIG. 1A is a schematic diagram of a cell arrangement, to describe an example of procedures for cell reselection and cell selection. FIG. 1B is a diagram showing a neighbor list for each cell, held on the network side. FIG. 1C is a diagram showing a neighbor list for each cell, provided from the network side and held by a mobile station. Note that the neighbor lists shown in FIG. 1B are maintained by, for example, a management server and the like on a network. In addition, although a neighbor list typically includes the carrier frequency of each neighboring cell and other system parameters as mentioned earlier, the neighbor lists shown in FIGS. 1B and 1C only include the ID of each neighboring cell in order to avoid complexity, and the illustration of the system parameters and the like included in each list is omitted.

In this example, it is assumed that cells C1-1, C1-2 and C1-3 are macrocells, each of which has a relatively large coverage area (radio area), and that a cell C2-1 is a microcell, which has a relatively small radio area. The microcell C2-1 is a radio area inside a building or the like, for example. It is assumed here that the microcell C2-1 is deployed inside a building located in the macrocell C1-2.

In such a cell arrangement, it is assumed that a mobile station moves from the cell C1-1 to the cell C1-2 and then, after further entering the microcell C2-1, moves back in the cell C1-2. First, when the mobile station is located in the cell C1-1, the cell C1-1 provides the mobile station with information about (a neighbor list of) the neighboring cells of the cell C1-1, {C1-2, C1-3}. Accordingly, when the mobile station leaves the cell C1-1, the mobile station monitors the radio qualities only of the neighboring cells C1-2 and C1-3 on this neighbor list, whereby the mobile station can camp on the cell C1-2, which is in the direction of the movement of the mobile station. That is, by referring to the neighbor list, the mobile station can camp on the cell C1-2 through cell reselection, without performing cell selection (carrier sequential search).

When the mobile station has camped on the cell C1-2, the cell C1-2 provides its neighbor list to the mobile station. Here, if the area covered by the microcell C2-1 is an indoor area inside a building, house or the like, there can be some cases where information about the microcell C2-1 is not included in the neighbor list of the cell C1-2, {C1-1}, as shown in FIG. 1B. If the information about the microcell C2-1 is not provided on the neighbor list of the cell C1-2, the mobile station, when moving from the cell C1-2 to the microcell C2-1, needs to carry out the cell selection procedure by means of carrier sequential search, in order to camp on the microcell C2-1.

The mobile station camps on the microcell C2-1 through the cell selection procedure. However, as shown in FIG. 1B, information about a neighboring cell of the microcell C2-1 is not provided to the mobile station. Accordingly, a neighbor list maintained by the mobile station as to the cell C2-1 on which the mobile station is currently camping is empty, { }, as shown in FIG. 1C. With the neighbor list in such an empty state, when the mobile station moves back to the cell C1-2 from the microcell C2-1, the mobile station needs to perform cell selection again to camp on the cell C1-2.

Such a mobile station moving between an indoor microcell and an outdoor macrocell needs to perform cell selection, which takes a longer time than cell reselection, every time the mobile station moves. While performing cell selection, the mobile station is neither able to be called nor able to submit a call-setting request, falling into a state incapable of receiving services.

To avoid such cell selection, a serving cell needs to provide information about all of its neighboring cells to a mobile station. However, it is not always possible to provide such information about all the neighboring cells, for the reasons of too many neighboring cells, a limit to the bandwidth for transmitting the neighbor list information, and the like.

Moreover, if the method described in Japanese Patent Application Unexamined Publication No. 2001-526016 is applied, each base station in a neighborhood area needs to transmit a common neighbor list including information about all the cells in the neighborhood area. This method has the problem that the loads on the network increase as the number of neighboring cells rises. In addition, if there is a limit to the bandwidth for transmitting the neighbor list, it is not always possible to provide information about all the neighboring cells as described above.

SUMMARY OF THE INVENTION

An object of the present invention is to provide a method and an apparatus for mobility management of a mobile station by which an increase in the interruption of services to the mobile station can be avoided, as well as a mobile communications system and a mobile station using the same.

According to the present invention, a mobility management method of a mobile station in a mobile communications system, includes: storing a neighbor list received from a first cell to which the mobile station is connected, wherein the neighbor list includes neighboring cell information of the first cell; when the mobile station is connected to a second cell which is not included as neighboring cell information in the neighbor list, storing an association-based neighbor list including neighboring cell information that indicates at least association between the second cell and the first cell; and performing cell search using neighboring cell information included in the neighbor list and/or the association-based neighbor list.

Accordingly, an increase in the interruption of services to the mobile station can be avoided.

BRIEF DESCRIPTION OF THE DRAWINGS

FIG. 5 is a flowchart showing a mobility management procedure performed by the mobile station according to the example of the present invention.

FIG. 6 is a network diagram showing an example of a mobile communications system according to the present invention.

FIG. 7A is a schematic diagram of a cell arrangement, to describe a first operation example of a mobility management method according to a first example of the present invention.

FIG. 7B is a diagram showing an example of a neighbor list for each cell, held on the network side.

FIG. 7C is a diagram showing an example of neighbor lists NL-NW and NL-A for each cell, held by a mobile station.

FIG. 9A is a schematic diagram of a cell arrangement, to describe a third operation example of the mobility management method according to the first example of the present invention.

FIG. 9B is a diagram showing an example of a neighbor list and an association permission flag for each cell, held on the network side.

FIG. 9C is a diagram showing an example of neighbor lists NL-NW and NL-A for each cell, held by a mobile station.

FIG. 10A is a schematic diagram of a cell arrangement, to describe a fourth operation example of the mobility management method according to the first example of the present invention.

FIG. 10B is a diagram showing an example of a neighbor list and an association permission flag for each cell, held on the network side.

FIG. 10C is a diagram showing an example of neighbor lists NL-NW and NL-A for each cell, held by a mobile station.

FIG. 11A is a schematic diagram of a cell arrangement, to describe an operation example of a mobility management method according to a second example of the present invention.

FIG. 11B is a diagram showing an example of a neighbor list for each cell, held on the network side.

FIG. 11C is a diagram showing an example of neighbor lists NL-NW and NL-A for each cell, held by a mobile station.

FIG. 13 is a sequence diagram showing an operation example of a method for mobility management of a mobile station according to another exemplary embodiment of the present invention.

DETAILED DESCRIPTION OF THE PREFERRED EMBODIMENTS

1. Exemplary Embodiment

Figure 1:
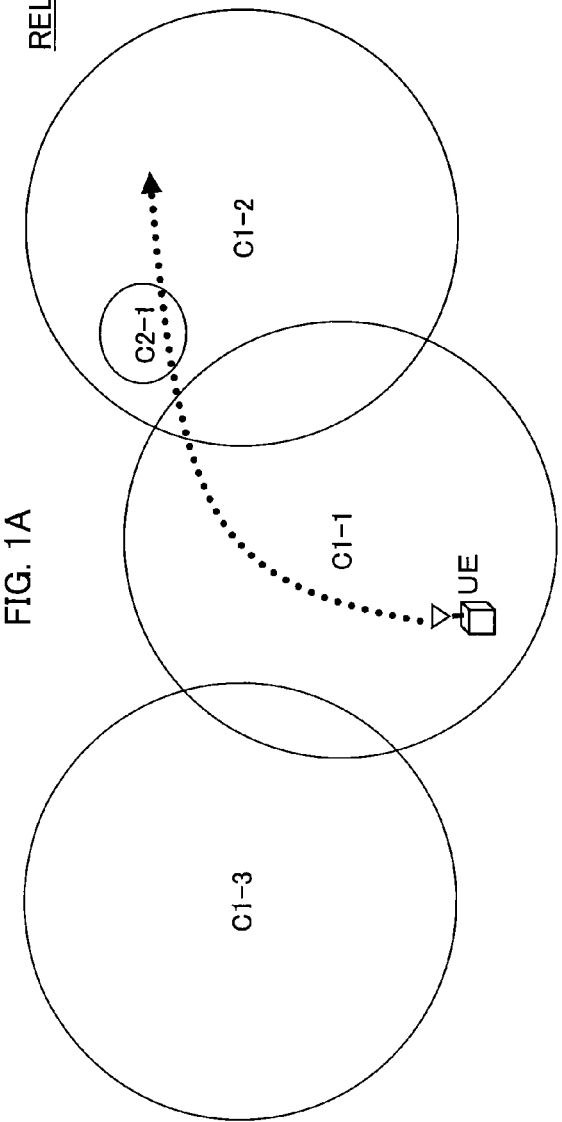
FIG. 1A is a schematic diagram of a cell arrangement, to describe an example of procedures for cell reselection and cell selection.
FIG. 1B is a diagram showing a neighbor list for each cell, held on the network side.
FIG. 1C is a diagram showing a neighbor list for each cell, provided from the network side and held by a mobile station.
Figure 2:
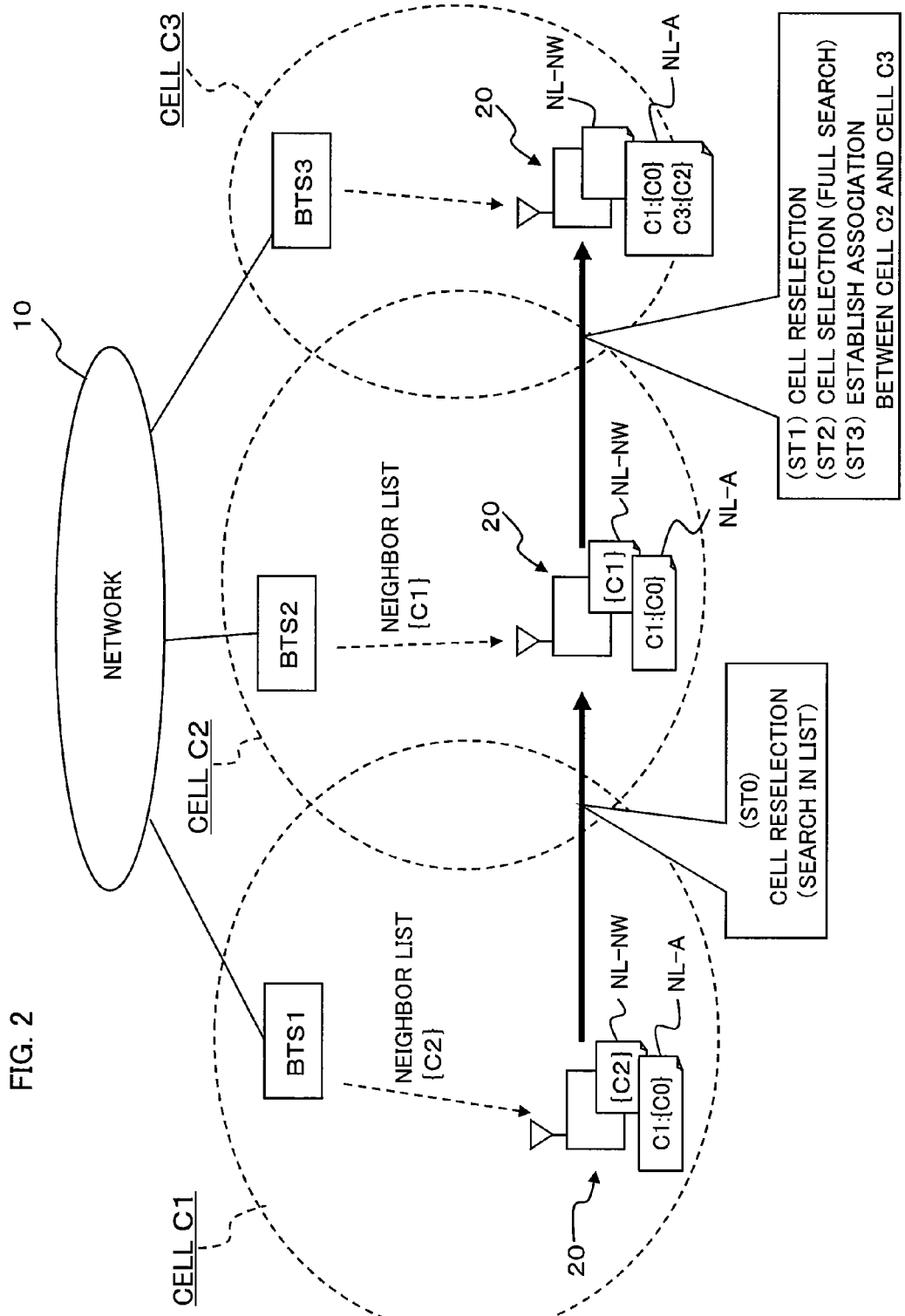
FIG. 2 is a network diagram showing an operation example of a mobile communications system according to an exemplary embodiment of the present invention.

FIG. 2 is a network diagram showing an example of a mobile communications system according to an exemplary embodiment of the present invention. Here, for simplicity, it is assumed that three cells C1 to C3 are connected sequentially and controlled by base stations BTS1 to BTS3 respectively, and that the base stations BTS1 to BTS3 are controlled from the network side (here, by an operation and maintenance (O&M) server or the like on a network 10). Note that although a single base station may control a plurality of cells, it is assumed here that a signal base station controls a single cell. Moreover, it is assumed that although a neighbor relationship between the cells C1 and C2 is provided from the network side, a neighbor relationship about the cell C3 is not provided. Hereinafter, a detailed description will be given of the mobility management of a mobile station in the case where, in such a cell arrangement, the mobile station moves from the cell C1 to the cell C2 and further moves to the cell C3.

1.1) Cell Reselection

A mobile station 20 includes a memory for storing a neighbor list NL-NW, which is provided from the network side, and a memory for storing a neighbor list NL-A, which is generated based on association, which will be described later. The neighbor list NL-NW includes information about a neighboring cell or neighboring cells of a cell, and the information is provided from the network side for each cell on which the mobile station 20 camps. The neighbor list NL-A includes information about cells having a neighbor relationship, and the information is obtained through association, which will be described later. Note that the information included in the neighbor lists is information for the mobile station 20 to camp on a cell, and includes, for example, BCCH scheduling information and the like. When changing cells, the mobile station 20 refers to the neighbor list NL-NW and/or neighbor list NL-A, whereby the mobile station 20 can change cells without performing cell selection.

First, when the mobile station 20 is located in the cell C1, the base station BTS1 of the cell C1 provides its neighbor list {C2} to the mobile station 20, which then stores this information {C2} in the neighbor list NL-NW. Hereinafter, a neighboring cell on a neighbor list will be represented by the ID of the cell, and information used to camp on a cell (hereinafter, also referred to as "cell information") will be represented by the ID of the cell parenthesized by { }, like {C2}. It is assumed that, at this point in time, a neighbor relationship (C1: {C0}), which means that the current cell C1 and information about the previous cell C0 (not shown), {C0}, are associated, has been stored in the neighbor list NL-A.

When the mobile station 20 having such neighbor lists NL-NW and NL-A approaches the cell C2 from the cell C1, the radio quality of the cell C1 deteriorates. If the state of deterioration the level of which is lower than a predetermined threshold value continues longer than a predetermined period of time set on a reselection timer, then the mobile station 20 starts a cell reselection procedure by referring to the neighbor list NL-NW and/or neighbor list NL-A. In this case, the mobile station 20 only monitors the radio quality of each cell according to the neighboring cell information stored in the neighbor lists NL-NW and NL-A, that is, the information about the cells C0 and C2, which are the neighboring cells of the current serving cell C1, whereby the mobile station 20 can camp on the cell C2, which is in the direction of the movement of the mobile station 20 (ST0). Since the mobile station 20 can detect a suitable cell to camp on through cell reselection in this manner, cell selection is not performed. Accordingly, the neighbor list NL-A is not updated upon this change of cell.

1.2) Cell Selection

When the mobile station 20 has thus camped on the cell C2, the base station BTS2 of the cell C2 provides its neighbor list {C1} to the mobile station 20, which then updates the neighbor list NL-NW to hold this information {C1}. The neighbor list NL-A remains holding the neighbor relationship (C1: {C0}). Subsequently, as the mobile station 20 moves from the cell C2 to the cell C3, the mobile station 20 refers to the neighbor list NL-NW and/or neighbor list NL-A as in the above-described case ST0. However, since there is no cell associated with the current cell C2 in the neighbor list NL-A, the mobile station 20 attempts to reselect a cell to camp on by monitoring the radio quality of the cell C1 according to the information {C1} stored in the neighbor list NL-NW (ST1). However, since the mobile station 20 cannot detect the cell C1 in this case, the mobile station 20 executes a cell selection procedure by means of carrier sequential search (ST2). Thereby, the mobile station 20 reads a downlink broadcast channel from the cell C3 and camps on the cell C3.

1.3) Association

Since the mobile station 20 has camped on the cell C3 through cell selection, the mobile station 20 associates the cell C3 on which the mobile station 20 has camped with information about the previous cell C2, {C2}, to obtain a neighbor relationship (C3: {C2}) and stores this information (C3: {C2}) in the neighbor list NL-A (ST3). Thus, the neighbor relationship (C3: {C2}) with respect to the cell C3 and the neighbor relationship (C1: {C0}) with respect to the cell C1 are stored in the neighbor list NL-A. Since the base station BTS3 of the cell C3 does not provide a neighbor list on the network side, the neighbor list NL-NW in the mobile station 20 becomes empty.

As described above, the mobile station 20 performs the cell selection and thereby holds the neighbor relationship between the cell C3 and the previous cell C2 in the neighbor list NL-A, with respect to the cell C3 about which a neighbor relationship is not provided from the base station BTS3. In other words, the mobile station 20 can autonomously complement a neighbor relationship that is not provided from the network side. Accordingly, when the mobile station 20 goes back to the cell C2 again, the mobile station 20 can camp on the cell C2 promptly by reselecting the neighboring cell C2 on the neighbor list NL-A. Thereafter, even if the mobile station 20 leaves and enters the cell C2 repeatedly, the mobile station 20 can always camp on the cell C2 or C3 through cell reselection as long as the neighbor relationship between the cells C2 and C3 is stored in the neighbor list NL-A.

Note that the association of a new cell with a previous cell, which is occasioned by the execution of the cell selection procedure, can be performed conditionally, which will be described in detail with another exemplary embodiment. This is because there are some cases, for example, where a new cell is temporally set, and where cells do not physically neighbor to each other in actuality.

Moreover, it is also possible that the network side controls the association procedure, which is performed by the mobile station 20 using the neighbor list NL-A. For example, when the mobile station 20 has camped on the cell C3 through the cell selection procedure, the base station BTS3 of the cell C3 may send, through BCCH, a control signal that enables/disables the use of the neighbor list NL-A.

Furthermore, both of the new and previous cells may be suitable cells. At least one of the new and previous cells may be an acceptable cell. The acceptable cell is a cell of which the reception quality satisfies a cell selection criterion and on which a mobile station can camp to receive limited services.

Additionally, in the above description, when a new association (neighbor relationship) is stored in the association-based neighbor list NL-A, information about the cell that is newly selected through cell selection for the mobile station to camp on is associated with information about the previous cell and then stored. However, the information about the cell to be associated is not limited to the information about the cell on which the mobile station has newly camped. If a plurality of cells satisfying a criterion, such as having a certain level of radio quality, are detected upon cell selection, it is also possible that, among the detected cells, information about a cell that is not included in the neighbor list NL-NW is associated with information about the previous cell and the obtained association is stored in the association-based neighbor list NL-A. By doing so, in some cases, the number of times cell selection is performed can be reduced.

2. System Configuration

Figure 3:
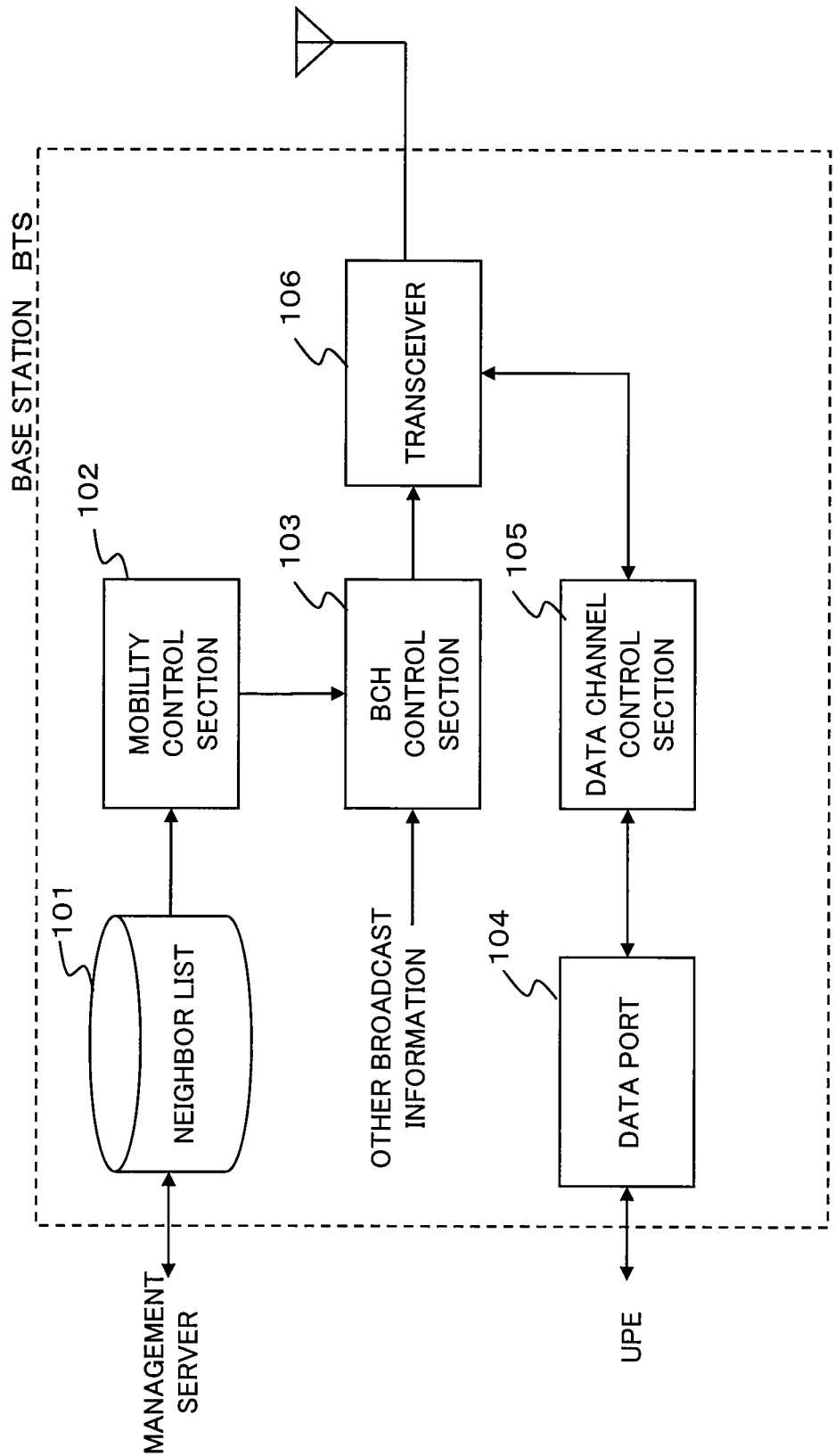
FIG. 3 is a schematic block diagram showing a base station in a mobile communications system according to an example of the present invention.

FIG. 3 is a schematic block diagram showing a base station in a mobile communications system according to an example of the present invention. Here, only the configuration of major parts related to the present invention is shown. In addition, it is assumed that, as an example, the base station BTS is connected to a management server or an operation and maintenance (O & M) server on a network 10 and also to a user plane processor (UPE: User Plane Entity).

The base station BTS is provided with a neighbor list 101, which stores information, provided by the O & M server, about a neighboring cell or neighboring cells of the cell of this base station BTS. The neighbor list 101 is constructed by the O & M server of the base station BTS. A mobility control section 102 manages the delivery of the neighbor list 101, such as the frequency of delivery, for example. A broadcast channel (BCH) control section 103 multiplexes the neighbor list 101 with other broadcast information on a broadcast channel. A user data packet from the UPE arrives at a data port 104 and is output to a transceiver 106 through a data channel control section 105. The transceiver 106 multiplexes the broadcast channel and a data channel for transmission by using, for example, different codes or frequency resources. Note that the delivery of the neighbor list 101 from the base station BTS to a mobile station can also be accomplished through a dedicated channel, not through the broadcast channel.

Figure 4:
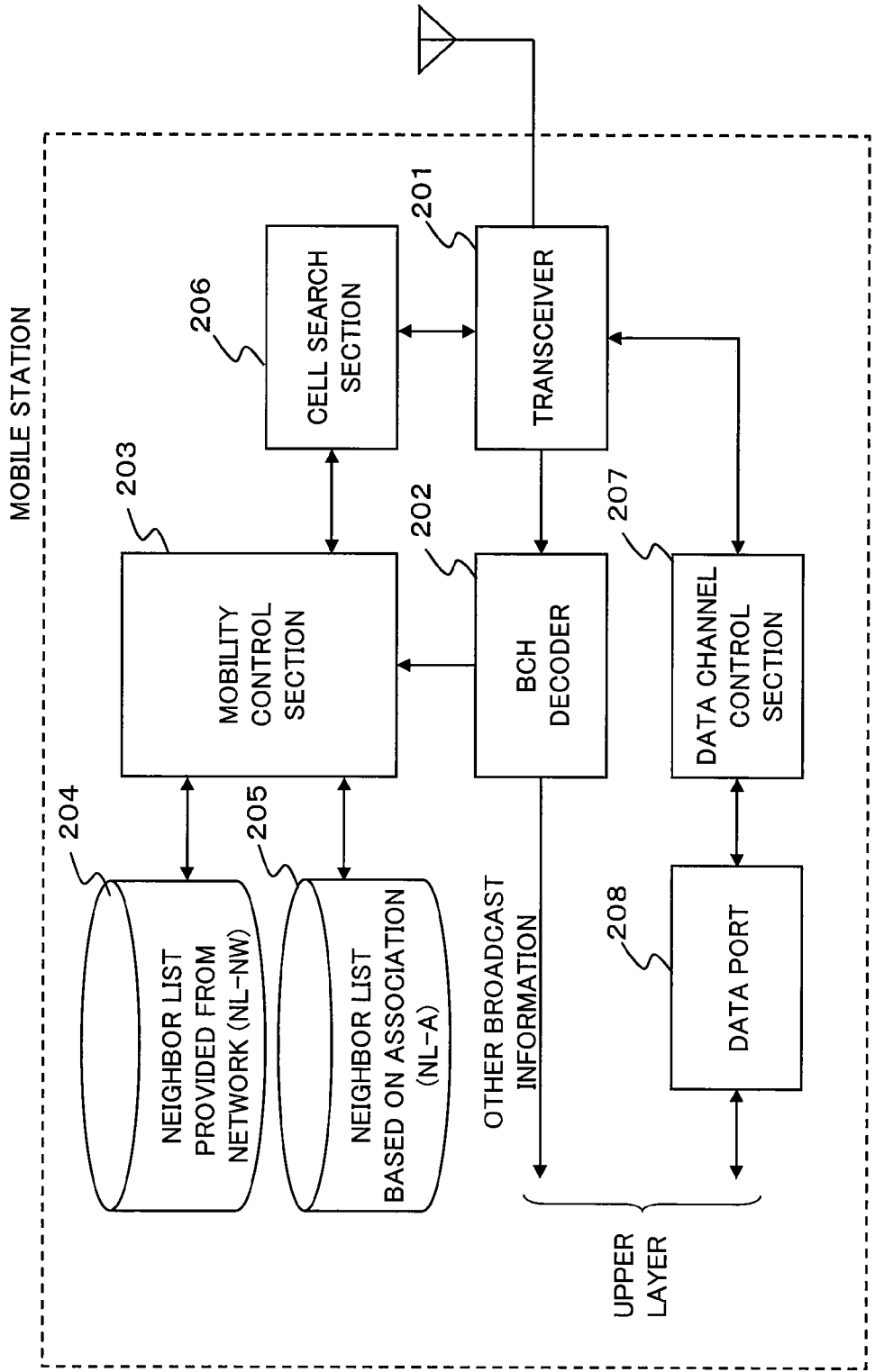
FIG. 4 is a schematic block diagram showing a mobile station in the mobile communications system according to the example of the present invention.

FIG. 4 is a schematic block diagram showing a mobile station in the mobile communications system according to the example of the present invention. Here, only the configuration of major parts related to the present invention is shown. A transceiver 201 of the mobile station has radio-related functions of, for example, modulation, demodulation, and the like. The transceiver 201 receives a broadcast channel from a base station BTS and transmits/receives control signals and data signals to/from the base station BTS. Moreover, the transceiver 201 demultiplexes the broadcast channel from other channels, and outputs broadcast information to a BCH decoder 202 and a data channel to a data channel control section 207.

The BCH decoder 202 separates out neighbor list information, received from the base station BTS of the serving cell, from other broadcast information, and outputs the neighbor list information to a mobility control section 203 and the other broadcast information to an upper layer.

The mobility control section 203 manages an internal memory 204 that stores a neighbor list NL-NW received from the network side and an internal memory 205 that stores a neighbor list NL-A generated based on association, and provides a cell search section 206 with information about a neighboring cell or neighboring cells read from the internal memory 204 and/or internal memory 205. The cell search section 206 can execute the cell reselection procedure by using the provided information about the neighboring cell(s). Moreover, as described above, occasioned by the execution of the cell selection procedure, the mobility control section 203 associates a new cell with the previous cell and stores the neighbor list NL-A including information about this association in the internal memory 205.

The cell search section 206 carries out a radio-related procedure required to perform cell selection or cell reselection. For example, the cell search section 206 monitors the radio qualities of the serving cell and neighboring cell(s), based on signals received by the transceiver 201 from the serving cell and neighboring cell(s), and utilizes the results of this monitoring to perform cell selection or cell reselection. The radio quality can be obtained by measuring the signal intensity of a pilot channel, the error rate and/or signal-to-noise ratio (SNR) of a broadcast channel, or the like. A user data packet from an upper layer arrives at a data port 208 and is output, through the data channel control section 207, to the transceiver 201 for transmission.

Note that mobility management functions performed by the mobility control section 203 and cell search section 206, which will be described later, can also be implemented by executing a program on a program-controlled processor or a computer.

3. Mobility Management

FIG. 5 is a flowchart showing a mobility management procedure performed by the mobile station according to the example of the present invention. First, upon receipt of a neighbor list from the base station BTS of the serving cell in which the mobile station is located, the mobility control section 203 of the mobile station stores the received neighbor list as a neighbor list NL-NW in the internal memory 204.

The cell search section 206 of the mobile station checks the radio quality of the current serving cell and determines whether or not the radio quality satisfies a condition for activating the measurement of a neighboring cell (ST301). Specifically, the cell search section 206 determines whether or not the radio quality of the current serving cell has deteriorated below a predetermined threshold value and whether or not this state of deterioration continues until a reselection timer expires.

If the radio quality satisfies the condition for activating the measurement of a neighboring cell (ST301: YES), the mobility control section 203 reads information about a cell included in the neighbor list NL-NW stored in the internal memory 204 and provides the information to the cell search section 206. Based on this information, the cell search section 206 measures the radio quality of the neighboring cell about which the information is provided from the network 10 (ST302).

Moreover, if there is a neighboring cell associated with the current serving cell on the neighbor list NL-A stored in the internal memory 205, the mobility control section 203 reads information about this neighboring cell and provides the information to the cell search section 206. Based on this information, the cell search section 206 measures the radio quality of the neighboring cell about which the information is obtained based on association (ST303). The association-based neighbor list NL-A includes neighboring cell information for each cell, which will be described later. Therefore, when the mobility control section 203 refers to the neighbor list NL-A, it is sufficient for the mobility control section 203 to read information only about the neighboring cell(s) of the current serving cell, allowing the cell search section 206 to measure the radio quality only of the neighboring cell(s) of the current serving cell.

Note that when a control signal instructing not to use the neighbor list NL-A is received from the network side through the base station of the serving cell, it is also possible to control so that the mobility control section 203 will skip the step ST303.

In this manner, the cell search section 206 determines whether or not a suitable cell is detected in the neighborhood (ST304). When a suitable cell is not detected (ST304: NO), the cell selection procedure is executed (ST305). When a suitable cell is detected (ST304: YES), the mobile station camps on this cell as its serving cell (ST311).

Incidentally, when the cell search section 206 detects a suitable cell as a result of measuring the radio quality of the neighboring cell included in the neighbor list NL-NW (ST302), the cell search section 206 may also camp on the detected suitable cell as its serving cell (ST311), without performing the step ST303 of measurement using the association-based neighbor list NL-A. Moreover, when a suitable cell cannot be detected in the step ST302 of measurement using the neighbor list NL-NW, the cell search section 206 may also subsequently perform the step ST303 of measurement using the association-based neighbor list NL-A. It is also possible to set priorities in order of reference between the neighbor list NL-NW and association-based neighbor list NL-A, which will be described later with another example.

When the cell selection procedure is finished, a procedure for camping on the new serving cell (such as, for example, reading of system information) is carried out, and a neighbor list and an association permission flag are provided from the new serving cell (ST306). However, there are some cases where the neighbor list is not provided.

When the cell selection (ST305) is started, a timer is activated. The mobility control section 203 determines whether or not the cell selection procedure is finished within a predetermined expiration time $T_{max}$ (ST307). If the cell selection procedure is finished within the predetermined expiration time $T_{max}$ (ST307: YES), and if the association permission flag for the new serving cell indicates "permit" (ST308: YES), then the mobility control section 203 associates the new serving cell with the previous serving cell (ST309) and stores the neighbor list NL-A updated upon this association in the internal memory 205 (ST310).

If the cell selection procedure is not finished within the predetermined expiration time $T_{max}$ (ST307: NO), or if the association permission flag for the new serving cell indicates "prohibit" (ST308: NO), then the mobility control section 203 camps on the detected cell as its serving cell without performing association (ST311).

Note that in this example, the association permission flag and the time required to execute the cell selection procedure (hereinafter, referred to as "cell selection execution duration") are used as conditions for performing association (association criteria), and control is performed such that the association-based neighbor list NL-A will be updated when these conditions are satisfied. However, it is also possible not to set one or any of such association criteria. In the case where the association criteria are not set, when a neighbor list is provided from the new serving cell (ST306), the mobility control section 203 associates the new serving cell with the previous serving cell (ST309) and stores the neighbor list NL-A updated upon this association in the internal memory 205 (ST310). Moreover, in the case where the association permission flag is not used as an association criterion, the step ST308 of determination of the association permission flag can be omitted. In the case where the cell selection execution duration is not used as an association criterion, the step ST307 of determination of the cell selection execution duration can be omitted.

4. First Example

FIG. 6 is a network diagram showing an example of a mobile communications system according to the present invention. In this example, the Internet 401 and a radio network 403 can communicate through a gateway (GW) 402, and the radio network 403 includes a plurality of base stations BTS and a mobile station UE. The plurality of base stations BTS are connected to an O&M server 404, which carries out operation and maintenance of these base stations BTS.

The gateway 402 is a network node for allowing each base station BTS to communicate with a communication entity on the Internet 401. A data packet transmitted from the communication entity on the Internet 401 to the mobile station UE on the radio network 403 is first delivered to the gateway 402, from which the data packet is delivered to the destination mobile station UE via a base station. The O&M server 404 is a network server that carries out operation and maintenance of each base station BTS and makes a neighbor list for each base station BTS.

Cells C1-1, C1-2, and C1-3 are controlled by base stations BTS1-1, BTS1-2, and BTS1-3, respectively, and a microcell C2-1 is controlled by a base station BTS2-1. The plurality of base stations BTS including the base stations BTS1-1 to BTS1-3 and BTS2-1 are connected to each other through the radio network 403 and are also connected to each of the gateway 402 and the O&M server 404. Here, it is assumed that the cells C1-1 to C1-3 are macrocells, each of which has a relatively large coverage area (radio area), and that the cell C2-1 is a microcell, which has a relatively small radio area. The microcell C2-1 is a radio area inside a building or the like, for example. It is assumed here that the microcell C2-1 is deployed inside a building located in the macrocell C1-2.

Examples of the specific operation of a mobility management method according to a first example of the present invention in such a network structure will be described below.

4.1) First Operation Example

FIG. 7A is a schematic diagram of a cell arrangement, to describe a first operation example of the mobility management method according to the first example of the present invention. FIG. 7B is a diagram showing an example of a neighbor list for each cell, held by the O & M server. FIG. 7C is a diagram showing an example of neighbor lists NL-NW and NL-A for each cell, held by the mobile station UE.

Referring to FIG. 7A, it is assumed that the mobile station UE moves from the cell C1-1 to the cell C1-2 and, after further entering the microcell C2-1, moves back in the cell C1-2, as indicated by a dotted line 501. First, when the mobile station UE is located in the cell C1-1, the base station BTS1-1 of the cell C1-1 provides the mobile station UE with neighbor list information about the neighboring cells C1-2 and C1-3 of the cell C1-1, {C1-2, C1-3}, shown in FIG. 7B. The mobility control section 203 of the mobile station UE stores this information as a neighbor list NL-NW in the internal memory 204. Accordingly, when a procedure for measuring a neighboring cell is initiated as the mobile station UE moves from the cell C1-1 to the cell C1-2, the mobile station UE monitors the radio qualities only of the neighboring cells C1-2 and C1-3 on this neighbor list NL-NW, whereby the mobile station UE can camp on the cell C1-2, which is in the direction of the movement of the mobile station UE (cell reselection).

When the mobile station UE has camped on the cell C1-2 through cell reselection, the base station BTS1-2 of the cell C1-2 provides the mobile station UE with neighbor list information {C1-1} shown in FIG. 7B. The mobility control section 203 of the mobile station UE updates the neighbor list NL-NW by using this information and stores the updated neighbor list NL-NW in the internal memory 204.

Subsequently, as the mobile station UE moves from the cell C1-2 to the cell C2-1, the mobile station UE similarly refers to the neighbor list NL-NW and/or neighbor list NL-A. However, since there is no cell associated with the current cell C1-2 in the neighbor list NL-A at this point in time, the mobile station UE attempts to reselect a cell to camp on by monitoring the radio quality of the cell C1-1 on the neighbor list NL-NW. However, in this case, since the cell C1-1 cannot be detected, the mobile station UE executes the cell selection procedure in which all possible frequencies are searched. Thereby, the mobile station UE reads a downlink broadcast channel from the cell C2-1 and camps on the cell C2-1.

Since the mobile station UE has camped on the cell C2-1 through cell selection, the mobile station UE associates the cell C2-1 on which the mobile station UE has camped with the previous cell C1-2 and stores information about this association as a neighbor list NL-A in the internal memory 205. Thus, as shown in the column of "NEIGHBOR LIST NL-A" in FIG. 7C, information about the cell C2-1 associated with the cell C1-2, {C2-1}, and information about the cell C1-2 associated with the cell C2-1, {C1-2}, are individually entered in the neighbor list NL-A.

When the mobile station UE having such a neighbor list NL-A leaves the radio area of the cell C2-1 to be back in the cell C1-2, the mobile station UE can reselect the cell C1-2 without executing the cell selection procedure. This is because, after performing cell selection to camp on the cell C2-1, the mobile station UE has associated the new cell C2-1 with the previous cell C1-2. Accordingly, when the mobile station UE detects deterioration in the radio quality of the cell C2-1, the mobile station UE refers to the neighbor lists NL-NW and NL-A and measures the radio quality of the cell C1-2 in this example, which is included in the neighbor list NL-A and is associated with the cell C2-1. Thus, the mobile station UE can reselect the cell C1-2, without executing the cell selection procedure by means of carrier sequential search.

4.2) Second Operation Example

Figures 8A, 8B, 8C:
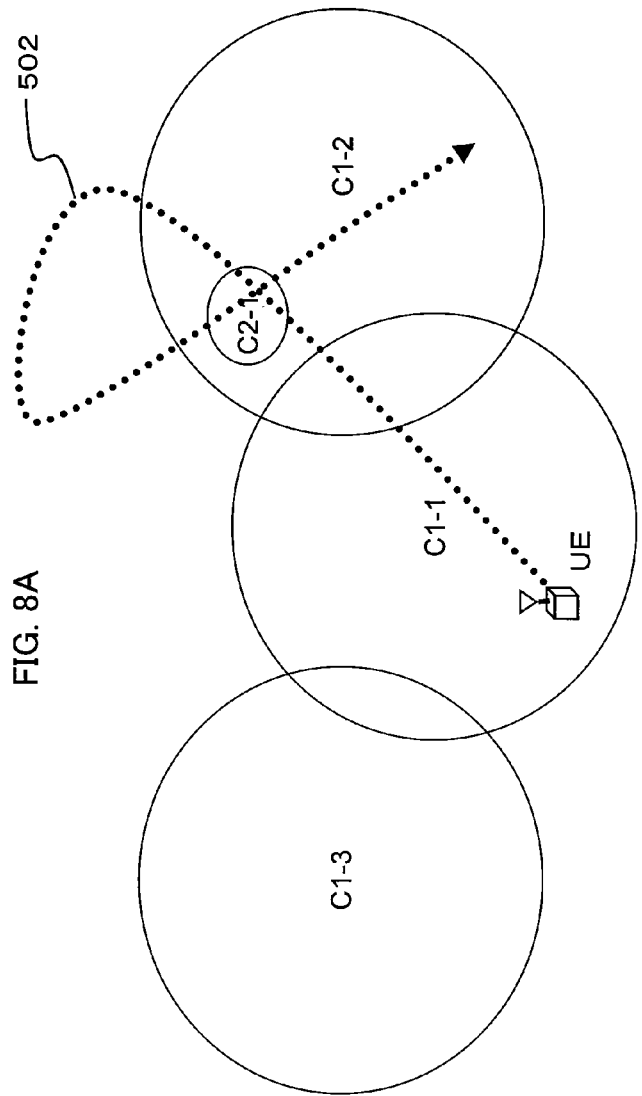
FIG. 8A is a schematic diagram of a cell arrangement, to describe a second operation example of the mobility management method according to the first example of the present invention.
FIG. 8B is a diagram showing an example of a neighbor list for each cell, held on the network side.
FIG. 8C is a diagram showing an example of neighbor lists NL-NW and NL-A for each cell, held by a mobile station.

FIG. 8A is a schematic diagram of a cell arrangement, to describe a second operation example of the mobility management method according to the first example of the present invention. FIG. 8B is a diagram showing an example of a neighbor list for each cell, held by the O & M server. FIG. 8C is a diagram showing an example of neighbor lists NL-NW and NL-A for each cell, held by the mobile station UE.

According to the present example, even if the mobile station UE repeats entering and leaving the cell C2-1 on more than one occasions as shown in FIG. 8A, the mobile station UE can reselects the cell C1-2 or C2-1 without executing the cell selection procedure. This is a conceivable scenario in real life, considering that workers enter and leave an office building several times a day.

As described in the first operation example, when the mobile station UE enters the cell C2-1 for the first time, the mobile station UE camps on the cell C2-1 by performing cell selection because the cell C1-2 does not provide cell information about the cell C2-1. The mobile station UE associates the cell C2-1 on which the mobile station UE has camped with the previous cell C1-2 and stores information about this association as a neighbor list NL-A in the internal memory 205. Thereby, information about the cell C2-1 associated with the cell C1-2, {C2-1}, and information about the cell C1-2 associated with the cell C2-1, {C1-2}, are individually entered in the neighbor list NL-A, as shown in the column of "NEIGHBOR LIST NL-A" in FIG. 8C. When the mobile station UE having such a neighbor list NL-A moves from the area of the cell C2-1 to the cell C1-2, the mobile station UE can reselect the cell C1-2 by using the neighbor list NL-A.

Moreover, even when the mobile station UE moves back into the area of the cell C2-1 again as indicated by a dotted line 502 in FIG. 8A, the mobile station UE can reselect the cell C2-1, without executing the cell selection procedure, by referencing the neighbor list NL-A storing the information about the association between the previous cell C1-2 and the new cell C2-1.

4.3) Third Operation Example

FIG. 9A is a schematic diagram of a cell arrangement, to describe a third operation example of the mobility management method according to the first example of the present invention. FIG. 9B is a diagram showing an example of a neighbor list and an association permission flag for each cell, held by the O&M server. FIG. 9C is a diagram showing an example of neighbor lists NL-NW and NL-A for each cell, held by the mobile station UE.

According to the present operation example, it can be controlled from the network side to permit the mobile station UE to perform association or to prohibit the mobile station UE from performing association. When the mobile station UE camps on a new cell with which association is prohibited by the network side, the mobile station UE does not associate this new cell with the previous cell. That is, a flag for permitting/prohibiting association is used to set a condition for performing association (an association criterion).

Referring to FIG. 9A, the radio areas of the stationary cells C1-1 to C1-3 are fixed. On the other hand, it is assumed that the base station BTS2-1 of the cell C2-1 is installed on a movable (non-stationary) device and the radio area of the cell C2-1 can be moved. A conceivable example of such a non-stationary cell C2-1 in real life is a hotspot inside a train car or bus. Here, it is assumed that the mobile station UE moves within the cell C1-1, camps on the non-stationary cell C2-1, and then, while remaining camping on the non-stationary cell C2-1, moves from the cell C1-1 to the cell C1-2.

In the case where the cell C2-1 moves, the cell C2-1 neighbors a certain stationary cell for a limited period of time. Therefore, the O&M server controlling the cell C2-1 does not include the non-stationary cell C2-1 in a neighbor list for each stationary cell. Moreover, by each cell sending the mobile station UE a flag indicating that association is permitted/prohibited as well as a neighbor list, the mobile station UE can be instructed not to associate this cell C2-1 with another cell after the cell C2-1 is selected through cell selection.

First, when the mobile station UE enters the cell C2-1 for the first time, the mobile station UE performs cell selection and thereby camps on the movable cell C2-1 because the cell C1-2 does not provide information about the non-stationary cell C2-1 as its neighboring cell. In this event, the base station BTS2-1 of the non-stationary cell C2-1 sends the mobile station UE a flag indicating that association is prohibited. By this prohibition of association, even if the mobile station UE located in the non-stationary cell C2-1 moves from the non-stationary cell C2-1 into a stationary cell, the mobile station UE does not associate this stationary cell with the non-stationary cell C2-1.

For example, if the mobile station UE moves to enter the area of the cell C1-2 while remaining camping on the non-stationary cell C2-1 and then leaves the non-stationary cell C2-1 to be in the cell C1-2, the mobile station UE camps on the cell C1-2 through cell selection. In this case, a neighbor list for the cell C1-2, {C1-1}, and a flag indicating that association is permitted are sent to the mobile station UE. However, the mobile station UE does not update the association-based neighbor list NL-A because the previous cell is the non-stationary cell C2-1, with which association is prohibited. Accordingly, when the mobile station UE moves back to the cell C1-1 from the cell C1-2, the mobile station UE uses the neighbor list NL-NW provided from the network side, whereby the mobile station UE can reselect the cell C1-1.

In this manner, while the mobile station UE is located in a stationary cell, the mobile station UE can avoid searching for the non-stationary cell C2-1 through cell reselection. On the other hand, while the mobile station UE is located in the non-stationary cell C2-1, the mobile station UE can avoid searching for a stationary cell through cell reselection. Thus, cell selection can be avoided, which would be performed if a suitable cell fails to be found through cell reselection.

4.4) Fourth Operation Example

FIG. 10A is a schematic diagram of a cell arrangement, to describe a fourth operation example of the mobility management method according to the first example of the present invention. FIG. 10B is a diagram showing an example of a neighbor list and an association permission flag for each cell, held by the O&M server. FIG. 10C is a diagram showing an example of neighbor lists NL-NW and NL-A for each cell, held by the mobile station UE.

According to the present operation example, when a predetermined period of time has passed since the mobile station UE started cell selection, it is determined that a new cell has no neighbor relationship with the previous cell, and association between the new cell and the previous cell is prohibited. That is, the cell selection execution duration is used to set a condition for performing association (an association criterion).

It is assumed that a long tunnel 601 exists, linking the cells C1-3 and C2-1 that do not neighbor to each other, and that there is no radio area in the tunnel 601. Specifically, a conceivable one for the tunnel 601 in real life is a long tunnel in a mountainous area or a long underpass in a city. In the case where the mobile station UE moves along the tunnel 601, association between neighboring cells are prohibited based on the cell selection execution duration.

For example, when the mobile station UE enters the tunnel 601 from the cell C1-3 side toward the cell C2-1 as indicated by a dotted line 504 in FIG. 10A, the mobile station UE first attempts to execute the cell reselection procedure based on neighbor list information {C1-1} provided by the cell C1-3 (ST602). However, since there is no radio area in the tunnel 601, the mobile station UE cannot detect the neighboring cell C1-1 on the neighbor list. When a predetermined reselection timer has expired, the mobile station UE starts the cell selection procedure (ST603). Then, while the mobile station UE is moving along the tunnel 601, the mobile station UE continues carrier sequential search to select a cell. There are some cases where the tunnel 601 is so long that the mobile station UE takes, for example, several minutes to pass through the tunnel 601.

Assuming that the mobile station UE exits from the tunnel 601 when a period T has passed since the cell selection procedure was started, the mobile station UE then detects the cell C2-1 (ST604). Since the mobile station UE has found the new cell C2-1 through cell selection, the mobile station UE, if in a usual situation, attempts to associate the new serving cell (the cell C2-1) with the previous serving cell (the cell C1-3). However, if the period (cell selection duration) T exceeds a predetermined threshold value $T_{max}$, it is determined that there is no neighbor relationship between the new serving cell and the previous serving cell, and the mobile station UE does not associate the cell C2-1 with the cell C1-3 even if an association permission flag for the new cell C2-1 indicates "permit". Accordingly, when the mobile station UE is located in the cell C1-3, the cell C2-1 is not a target of cell reselection because the cell C2-1 is not a neighboring cell of the cell C1-3, and when the mobile station UE is located in the cell C2-1, the cell C1-3 is not a target of cell reselection because the cell C1-3 is not a neighboring cell of the cell C2-1. Thus, cell selection can be avoided, which would be performed if a suitable cell fails to be found through cell reselection.

It is also conceivable to use the passing speed V of the mobile station UE as another condition for performing association (another association criterion). For example, the distance between the previous cell C1-3 and the new cell C2-1 is calculated by multiplying the passing speed V of the mobile station UE by the cell selection duration T. If this distance exceeds a predetermined threshold value, it can also be determined that there is no neighbor relationship between the new serving cell and the previous serving cell.

5. Second Example

A description will be given of a specific operation example of a mobility management method according to a second example of the present invention, in the network as shown in FIG. 6. According to the present example, a new serving cell and its neighboring cell or cells are associated with the previous serving cell. For example, the present example can be applied to such a case where a group of microcells, consisting of neighboring cells that are close together like a group, exists in an office building inside which the area is covered by a plurality of indoor base stations.

FIG. 11A is a schematic diagram of a cell arrangement, to describe the operation example of the mobility management method according to the second example of the present invention. FIG. 11B is a diagram showing an example of a neighbor list for each cell, held by the O & M server. FIG. 11C is a diagram showing an example of neighbor lists NL-NW and NL-A for each cell, held by the mobile station UE.

It is assumed that two neighboring microcells C2-1 and C2-2 exist here, deployed in the radio area of a macrocell C1-2, as shown in FIG. 11A. In this case, when the mobile station UE enters the cell C2-1 from the cell C1-2, the mobile station UE performs cell selection as described above. In this event, however, the mobile station UE associates the new serving cell C2-1 and its neighboring cell C2-2 with the previous serving cell C1-2 and stores information about this association in the neighbor list NL-A. That is, as shown in the column of "NEIGHBOR LIST NL-A" in FIG. 11C, neighboring cell information {C2-1, C2-2} associated with the cell C1-2 is stored in the neighbor list NL-A, and neighboring cell information {C1-2} associated with each of the cells C2-1 and C2-2 is stored in the neighbor list NL-A.

With the neighbor list NL-A in such a state, when the mobile station UE enters the area of the microcell C2-2 from the microcell C2-1, the mobile station UE performs sell reselection because neighboring cell information {C2-2} is on the neighbor list NL-NW. When the mobile station UE leaves the cell C2-2 to be back in the macrocell C1-2, the mobile station UE can reselect the macrocell C1-2 without performing cell selection because the neighboring cell information {C1-2} associated with the cell C2-2 is included in the neighbor list NL-A.

It is not efficient to associate a neighboring cell of a new serving cell with the previous serving cell in the case where the neighboring cell of the new serving cell does not physically neighbor to the previous serving cell. In the case shown in FIGS. 11A to 11C, the two neighboring microcells C2-1 and C2-2 are located in the macrocell C1-2 that has a radio area covering the microcells C2-1 and C2-2. Therefore, if the cells C2-1 and C2-2 are both macrocells, there is no overlapping radio area between the cells C2-2 and C1-2, and therefore it is preferable not to associate the cell C2-2 with the cell C1-2. This can be accomplished by the cell C2-1 providing information about the area of each of its neighboring cells. In other words, the mobile station UE can associate the cell C2-2 with the cell C1-2 only in the case where the mobile station UE knows that the cells C2-1 and C2-2 are both microcells. This can be accomplished by the O&M server providing information about the cell type of a neighboring cell as part of neighbor list information.

6. Other Examples

In the above-described examples, the mobile station UE needs to read a neighbor list provided by its serving cell every time the serving cell is changed. However, the mobile station UE can also keep the neighbor list of a previous serving cell, instead of clearing the information provided by the previous serving cell. By keeping the neighbor lists of previous serving cells, if a new serving cell is involved in one of the previous serving cells, the mobile station UE can start measuring a neighboring cell before reading a neighbor list from the new serving cell. According to the present invention, an effect can be obtained even if the mobile station UE stores a neighbor list provided by a previous serving cell. This is because the mobile station UE not only stores a neighbor list provided from the network side but also can store a neighbor list generated based on association.

Further, according to the above-described examples, the mobile station UE needs to measure the quality of each neighboring cell on the neighbor list provided from the network side and the quality of each neighboring cell of the current serving cell provided based on association. However, higher priority may be given to the measurement of the quality of each neighboring cell on the neighbor list provided from the network side, over the measurement of the quality of each neighboring cell of the current serving cell provided based on association. By this prioritization, the time required to find a suitable cell can be reduced. Accordingly, the mobile station UE can camp on a more suitable cell at higher speed.

Furthermore, according to the above-described examples, the mobile station UE stores the neighbor list NL-A provided based on association in the internal memory 205. It is also possible that, upon the completion of storing, the mobile station UE defines the period for which each piece of associated cell information is kept, in order to avoid permanently storing the associated cell information. The associated cell information can be cleared when power is turned off or when the network side instructs to clear all the association-related information stored (for example, at the time of cell reconstruction).

7. Other Exemplary Embodiment

In the above-described exemplary embodiment, the description is given of the case where the mobile station UE is in an idle mode. However, the present invention can also be applied to such a case where the mobile station UE is in an active mode.

Figure 12:
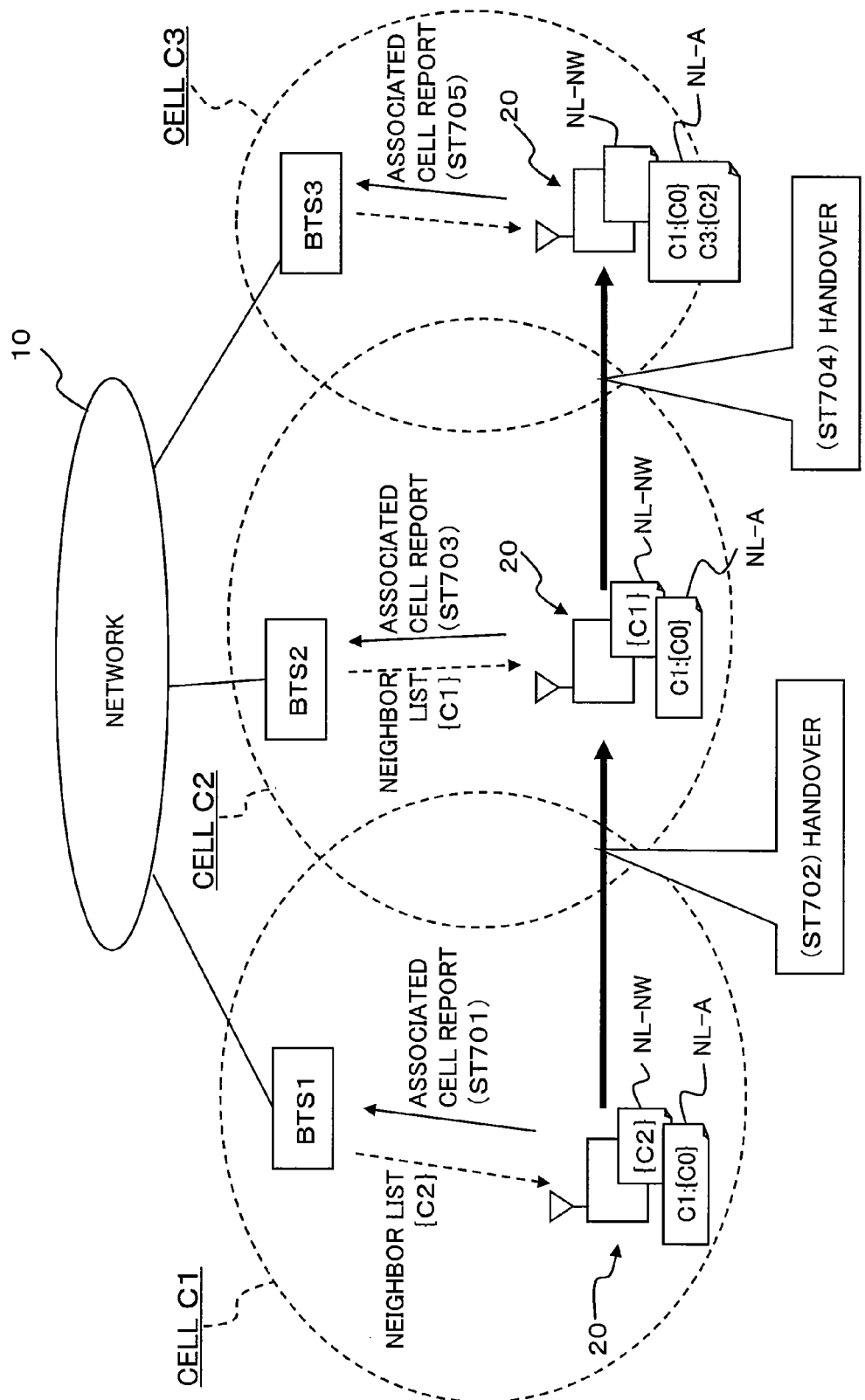
FIG. 12 is a network diagram to describe an operation example of a mobile communications system according to another exemplary embodiment of the present invention.

FIG. 12 is a network diagram to describe an operation example of a mobile communications system according to another exemplary embodiment of the present invention. The basic system structure is similar to that shown in FIG. 2, and therefore the same reference numerals and symbols as in FIG. 2 are used. Here as well, a neighbor relationship between the cells C1 and C2 is provided from the network side, but a neighbor relationship about the cell C3 is not provided. Hereinafter, a description will be given of handover control in the case where, in such a cell arrangement, a mobile station 20 that is communicating data moves from the cell C1 to the cell C2 and further moves to the cell C3.

The mobile station 20 is provided with memories that store a neighbor list NL-NW, which is provided from the network side, and a neighbor list NL-A, which is generated based on association, as described above already. When the mobile station 20 is located in the cell C1, the base station BTS1 of the cell C1 provides its neighbor list {C2} to the mobile station 20, which then holds this information {C2} in the neighbor list NL-NW. In addition, it is assumed that a neighbor relationship (C1: {C0}), in which the current cell C1 and information about the previous cell C0 (not shown), {C0}, are associated, is stored in the neighbor list NL-A.

The mobile station 20 that is located in the cell C1 and is communicating data through the serving base station BTS1 reports an associated neighboring cell (hereinafter, referred to as "associated cell") stored in the neighbor list NL-A to the serving base station BTS1 or to a current serving radio network controller (serving RNC) (ST701). A report about an associated cell (here, the cell C0) may be made periodically, or on demand in response to a request from the serving base station BTS1 or serving RNC. Additionally, it is also possible to control from the network side so that the mobile station 20 will stop reporting an associated cell. These controls can be performed through a dedicated channel or broadcast channel.

Subsequently, if handover from the cell C1 to the cell C2 is carried out for the mobile station 20 (ST702), the serving base station BTS1 or serving RNC generates handover candidate cells by combining the associated cell, which is reported by the mobile station 20, and a default candidate cell, and determines a target cell as the handover destination from among these handover candidate cells. In this example, since the associated cell is the cell C0 and the default candidate cell is the neighboring cell C2, the serving base station BTS1 or serving RNC determines that the cell C2 is the target cell and notifies it to the mobile station 20. Thus, the handover from the cell C1 to the cell C2 can be complete for the mobile station 20 in a state of communicating data.

Next, the mobile station 20 that is now located in the cell C2 and is communicating data through the serving base station BTS2 reports an associated cell (here, the cell C0) stored in the neighbor list NL-A to the serving base station BTS2 or a current serving RNC (ST703). As mentioned above, a report about an associated cell may be made periodically or on demand. It is also possible to control from the network side so that the mobile station 20 will stop reporting an associated cell.

Subsequently, if handover from the cell C2 to the cell C3 is carried out for the mobile station 20 (ST704), the serving base station BTS2 or current serving RNC generates handover candidate cells by combining the associated cell reported by the mobile station 20 and a default candidate cell, and determines a target cell as the handover destination from among these handover candidate cells. In this example, the associated cell is the cell C0, and the default candidate cell is the neighboring cell C1. Therefore, the mobile station 20 detects a cell to be a target by using a cell selection procedure that is basically similar to that used in the case of idle mode, and reports the detected cell to the serving base station BTS2 or current serving RNC. Thus, the handover from the cell C2 to the cell C3 can be complete for the mobile station 20 in a state of communicating data.

The mobile station 20 that is thus located in the cell C3 and is communicating data through the serving base station BTS3 associates the cell C3, on which the mobile station 20 has camped, with information about the previous cell C2, {C2}, to generate a neighbor relationship (C3: {C2}) and stores this information (C3: {C2}) in the neighbor list NL-A, because the mobile station 20 has camped on the cell C3 through cell selection. Thus, the neighbor relationship (C1: {C0}), with respect to the cell C1, and the neighbor relation ship (C3: {C2}), with respect to the cell C3, are stored in the neighbor list NL-A. Since the serving base station BTS3 of the cell C3 does not provide a neighbor list on the network side, the neighbor list NL-NW in the mobile station 20 becomes empty.

Accordingly, the mobile station 20 reports the associated cells stored in the neighbor list NL-A, or at least the associated cell C2 of the cell C3 in which the mobile station is currently located, to the serving base station BTS3 or current serving RNC (ST705). As mentioned above, a report about an associated cell may be made periodically or on demand. It is also possible to control from the network side so that the mobile station 20 will stop reporting an associated cell.

If the mobile station 20 moves back into the cell C2 again, the serving base station BTS3 or current serving RNC can determine a target cell and notifies it to the mobile station 20 at high speed, because the serving base station BTS3 or current serving RNC has already known the associated cell (here, the cell C2) of the cell C3. Thus, high-speed handover between the cells C2 and C3 can be carried out for the mobile station 20 in a state of communicating data.

FIG. 13 is a sequence diagram showing an example of a handover procedure to which the mobility management method shown in FIG. 12 is applied. The mobile station 20 that is located in a cell and is communicating data through a serving base station (serving BTS) 30 reports an associated cell stored in the neighbor list NL-A to the serving BTS 30 (or a current serving RNC) periodically, or on demand, unless the network side stops the mobile station 20 reporting an associated cell (ST801).

When a request for handover is sent to the serving BTS 30 by the mobile station 20 (ST802), the serving BTS 30 generates handover candidate cells by combining the latest associated cell reported by the mobile station 20 and a default candidate cell (ST803), and determines a target cell as the handover destination from among these handover candidate cells (ST804). When the target cell is determined, the serving BTS 30 notifies information about the target cell to the mobile station 20 (ST805), and handover control is carried out among the mobile station 20, the serving BTS 30, and a target BTS 31.

As described above, even if there is a neighboring cell that is not included as a default candidate cell, a station taking the initiative in the handover control can determine a target cell as the handover destination at high speed by referring to an associated cell reported by the mobile station 20.

Note that the present invention is not limited to a system using a single radio scheme but can also be applied even to a mobile communications system in which a plurality of radio schemes coexist. For example, referring to FIG. 2, the cell C1 may be a cell based on the 3G (3rd Generation) mobile system and the cell C2 may be a cell based on the LTE (Long Term Evolution) system. In this case, the mobile station 20 is multi-mode equipment that can operate with both of the 3G mobile system and LTE system. When the mobile station 20 moves from the 3G mobile system-based cell C1 to the LTE system-based cell C2, the mobile station 20 performs cell selection, whereby the mobile station 20 can associate the new cell C2 with the previous cell C1 and store information about this association in the neighbor list NL-A.

Moreover, the above description is given of the case where a mobile station camps only on a suitable cell. However, the present invention can also be applied in the case where a mobile station might camp on an acceptable cell. In this case, when the association-based neighbor list NL-A is updated upon cell selection, any one of the following and other like methods can be adopted in place of the method in which a cell on which the mobile station has newly camped is associated with a cell on which the mobile station immediately previously camped.

1) A cell on which the mobile station has newly camped is associated with a cell on which the mobile station immediately previously camped only in the case where both of the cells are suitable cells.

2) A cell on which the mobile station has newly camped is associated with a cell on which the mobile station immediately previously camped, regardless of whether the cells are suitable cells or acceptable cells.

3) A cell on which the mobile station has newly camped is associated with a cell on which the mobile station immediately previously camped only in the case where both of the cells are suitable cells or where both of the cells are acceptable cells.

Furthermore, in the above-described embodiments and examples, when a new association (neighbor relationship) is stored in the association-based neighbor list NL-A, stored is an association obtained by associating information about the cell on which the mobile station has camped through cell selection with information about the previous cell. However, this is not limitative. For example, upon cell selection, when a cell is detected that satisfies a criterion such as having a certain level of radio quality, and if this cell is not included in the neighbor list NL-NW, then information about this cell may be associated with information about the previous cell and stored in the association-based neighbor list NL-A. By doing so, there are some cases where the number of times cell selection is performed can be reduced.

8. Various Aspects

As described above, according to the present invention, when a mobile station is connected to a cell which is not included as neighboring cell information, at least the cell and a previous cell are associated conditionally or unconditionally. Using neighboring cell information obtained by such association can reduce the frequency of connection operation to a cell which is not included as neighboring cell information. In other words, after this association, the mobile station can use the neighboring cell information when the mobile station moves between associated cells and therefore eliminate the need for connection operation to the cell which is not included as neighboring cell information.

In an example of the present invention, there is provided an association criterion indicating a condition for performing association. Such association criterion can be used to control such that the association is performed when the association criterion is satisfied, for example, when a new cell is temporarily set or when a new cell does not actually neighbor to a previous cell. More specifically, in the case where a management section of a mobile communications system previously sets permission or prohibition of association for each cell, it is possible for the mobile station not to associate the new cell with the previous cell if the new cell has been set to association prohibition. As another example, it is also possible for the mobile station not to associate the new cell with the previous cell if a time duration in which a cell search that does not use neighboring cell information is performed exceeds a predetermined threshold.

In another example of the present invention, when the mobile station is connected to a cell which is not included as neighboring cell information, it is possible for the mobile station to associate this cell and its neighboring cell with the previous cell. In the case where a plurality of neighboring cells is deployed in group, the number of times connection to a cell which is not included as neighboring cell information has been made can be further reduced.

In addition, the management section of the mobile communications system can control the mobile station to use or not to use the association-based neighbor list. Further, the neighbor list can store neighboring cell information about not only the new cell but also the previous cell. Preferably, the neighbor list and the association-based neighbor list are prioritized previously.

In still another example of the present invention, an associated cell included in the association-based neighbor list is reported to a handover controller of the mobile communications system. Among candidate cells including associated cells, a target cell for handover can be determined. Since the associated cell obtained from the mobile station indicates a neighboring relationship between cells, it can be used for handover control to further reduce interruption time, resulting in high-speed handover.

A mobile station according to the present invention includes: a first memory for storing a neighbor list received from a first cell to which the mobile station is connected, wherein the neighbor list includes neighboring cell information of the first cell; a controller controlling such that when the mobile station is connected to a second cell which is not included as neighboring cell information in the neighbor list, the second cell is associated with the first cell; a second memory for storing an association-based neighbor list including neighboring cell information that indicates at least association between the second cell and the first cell; and a cell searcher for searching a cell by using neighboring cell information included in the neighbor list and/or the association-based neighbor list.

According to another aspect of the present invention, upon changing serving cell, the mobile station receives a neighbor list from a new serving cell; upon performing cell selection, the mobile station associates the new serving cell with the previous serving cell; upon measuring a quality degradation of current serving cell, the mobile station measures the quality of cells in the neighbor list and all associated cells; upon finding more suitable cell than current serving cell, the mobile station reselects to the more suitable cell.

In the case where a cell indicates prohibition of neighbor association, upon receiving the prohibition indication, the mobile station may not associate the new serving cell with the previous serving cell. Upon performing cell selection, the mobile station may not associate the new serving cell with the previous serving cell if duration of cell selection exceeds a predefined threshold. Upon performing cell selection, the mobile station may associate the new serving cell and its neighboring cells with the previous serving cell.

As described above, according to the present invention, when a mobile station has camped on a cell that is not included in neighboring cell information, the mobile station at least associates this cell with the previous cell unconditionally or conditionally. Thereby, even if information about all the neighboring cells is not provided, the mobile station can select a suitable cell at high speed. Accordingly, an increase in the interruption of services and an increase in power consumption can be avoided. That is, by using an association-based neighbor list, it is possible to reduce the frequency of a search (carrier sequential search) for a cell that is not included in neighboring cell information, and hence it is possible to enhance, as a whole, the speed at which a suitable cell is selected.

The present invention can be applied to mobile communications systems in general in which a plurality of cells controlled by a plurality of base stations are deployed and, particularly, to mobile stations or user equipment in such a system.

The present invention may be embodied in other specific forms without departing from the spirit or essential characteristics thereof. The above-described exemplary embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

The invention claimed is:

1. A method of for enabling data communication between a mobile station and a network including a plurality of cells each of which is able to communicate with the other cells of the plurality of cells, the method comprising:
   the mobile station maintaining a cell generated neighbor list and an association based neighbor list, the cell generated neighbor list being received from a first cell of the plurality of cells on which the mobile station is presently camped, the first information indicating a first subset of the plurality of cells which are neighbor cells to the first cell as well as information required to camp on each of the cells of the first subset of cells, the association based neighbor list being generated by the mobile station and including second information about neighbor relationships of cells of the plurality of cells discovered by the mobile station itself and not downloaded from any of the plurality of cells, the second information indicating a second subset of the plurality of cells which are neighbor cells to cells of the plurality of cells on which the mobile station was previously camped as well as information required to camp on the second set of cells; and
   the mobile station using information in the cell generated neighbor list and/or the association based neighbor list to camp on a cell of the plurality of cells other than the cell on which the mobile station is presently camped.

2. A method for enabling data communication between a mobile station and a network including a plurality of cells each of which is able to communicate with the other cells of the plurality of cells, the method comprising:
   the mobile station establishing a data connection with a first cell of the plurality of cells and receiving first neighbor information from the first cell and storing the received first neighbor information in a cell generated neighbor list on the mobile station, the first neighbor information comprising the identify of cells of the plurality of cells which are neighbor cells to the first cell;
   the mobile station subsequently establishing a data connection with a second cell of the plurality of cells, the second cell not being on the cell generated neighbor list and, in response thereto:
      deleting the first neighbor information from the cell generated neighbor list;
      storing second neighbor information, if any, received from the second cell in the cell generated neighbor list, the second neighbor information comprising information about cells of the plurality of cells which are neighbor cells to the second cell; and
      creating and storing associated neighboring cell information associating the second cell with the first cell in an association based neighbor list; and
   the mobile station switching its data connection from the second cell to a third cell which is in the cell generated neighbor list and/or in the association based neighbor list.

3. The method of claim 2, wherein the mobile station establishes the data connection with the second cell only after determining that it cannot establish a data connection with any of the cells identified in the first neighbor information.

4. The method of claim 2, wherein the mobile station selects the second cell as a function of the strength of the signal received from the second cell.

5. The method of claim 2, wherein the mobile station selects the second cell as a function of association criteria received from the network.

6. The method of claim 5, wherein the association criteria is a function of the strength of the signal received from the second cell.

7. The method of claim 2, wherein the mobile terminal establishes the data connection with the second cell after the quality of the data connection with the first cell falls below a predetermined level for at least a predetermined time period.

8. The method of claim 2, wherein the neighboring cell information associating the second cell with the first cell is stored in the association based neighbor list only if the time required to establish the data connection with the second cell was less than a predetermined time period.

9. The method of claim 2, wherein when the mobile terminal determines that its data connection with the first cell does not meet a first predetermined criteria, it searches for other cells with which it can establish a data connection.

10. The method of claim 9, wherein the mobile station identifies a plurality of cells with which it can establish a data connection and selects one of those cells as the second cell based upon a second predetermined criteria.

11. The method of claim 10, wherein the mobile station stores associated neighboring cell information associating a plurality of the identified plurality of cells with the first cell in the association based neighbor list.

12. A mobile communication system, comprising:
a network including a plurality of cells each of which is able to communicate with the other cells of the plurality of cells; and
a mobile station for:
establishing a data connection with a first cell of the plurality of cells and receiving first neighbor information from the first cell and storing the received first neighbor information in a cell generated neighbor list on the mobile station, the first neighbor information comprising the identify of cells of the plurality of cells which are neighbor cells to the first cell;
subsequently establishing a data connection with a second cell of the plurality of cells, the second cell not being on the cell generated neighbor list and, in response thereto:
deleting the first neighbor information from the cell generated neighbor list;
storing second neighbor information, if any, received from the second cell in the cell generated neighbor list, the second neighbor information comprising information about cells of the plurality of cells which are neighbor cells to the second cell; and
creating and storing associated neighboring cell information associating the second cell with the first cell in an association based neighbor list; and
switching its data connection from the second cell to a third cell which is in the cell generated neighbor list and/or in the association based neighbor list.

13. The mobile communication system of claim 12, wherein the mobile station establishes the data connection with the second cell only after determining that it cannot establish a data connection with any of the cells identified in the first neighbor information.

14. The mobile communication system of claim 12, wherein the mobile station selects the second cell as a function of the strength of the signal received from the second cell.

15. The mobile communication system of claim 12, wherein the mobile station selects the second cell as a function of association criteria received from the network.

16. The mobile communication system of claim 15, wherein the association criteria is a function of the strength of the signal received from the second cell.

17. The mobile communication system of claim 12, wherein the mobile terminal establishes the data connection with the second cell after the quality of the data connection with the first cell falls below a predetermined level for at least a predetermined time period.

18. The mobile communication system of claim 12, wherein the neighboring cell information associating the second cell with the first cell is stored in the association based neighbor list only if the time required to establish the data connection with the second cell was less than a predetermined time period.

19. The mobile communication system of claim 12, wherein when the mobile terminal determines that its data connection with the first cell does not meet a first predetermined criteria, it searches for other cells with which it can establish a data connection.

20. The mobile communication system of claim 19, wherein the mobile station identifies a plurality of cells with which it can establish a data connection and selects one of those cells as the second cell based upon a second predetermined criteria.

21. The mobile communication system of claim 20, wherein the mobile station stores associated neighboring cell information associating a plurality of the identified plurality of cells with the first cell in the association based neighbor list.

22. A non-transitory computer readable medium containing a program which, when ran on one or more processors associated with a mobile station which is in communication with a network including a plurality of cells each of which is able to communicate with the other cells of the plurality of cells, causes the mobile station to:
establish a data connection with a first cell of the plurality of cells and receiving first neighbor information from the first cell and storing the received first neighbor information in a cell generated neighbor list on the mobile station, the first neighbor information comprising the identify of cells of the plurality of cells which are neighbor cells to the first cell;
subsequently establish a data connection with a second cell of the plurality of cells, the second cell not being on the cell generated neighbor list and, in response thereto:
delete the first neighbor information from the cell generated neighbor list;
store second neighbor information, if any, received from the second cell in the cell generated neighbor list, the second neighbor information comprising information about cells of the plurality of cells which are neighbor cells to the second cell; and
create and store associated neighboring cell information associating the second cell with the first cell in an association based neighbor list; and
switch its data connection from the second cell to a third cell which is in the cell generated neighbor list and/or in the association based neighbor list.

23. The non-transitory computer readable medium of claim 22, wherein the mobile station establishes the data connection with the second cell only after determining that it cannot establish a data connection with any of the cells identified in the first neighbor information.

24. The non-transitory computer readable medium of claim 22, wherein the mobile station selects the second cell as a function of the strength of the signal received from the second cell.

25. The non-transitory computer readable medium of claim 22, wherein the mobile station selects the second cell as a function of association criteria received from the network.

26. The non-transitory computer readable medium of claim 25, wherein the association criteria is a function of the strength of the signal received from the second cell.

27. The non-transitory computer readable medium of claim 22, wherein the mobile terminal establishes the data connection with the second cell after the quality of the data connection with the first cell falls below a predetermined level for at least a predetermined time period.

28. The non-transitory computer readable medium of claim 22, wherein the neighboring cell information associating the second cell with the first cell is stored in the association based neighbor list only if the time required to establish the data connection with the second cell was less than a predetermined time period.

29. The non-transitory computer readable medium of claim 22, wherein when the mobile terminal determines that its data connection with the first cell does not meet a first predetermined criteria, it searches for other cells with which it can establish a data connection.

30. The non-transitory computer readable medium of claim 29, wherein the mobile station identifies a plurality of cells with which it can establish a data connection and selects one of those cells as the second cell based upon a second predetermined criteria.

31. The non-transitory computer readable medium of claim 30, wherein the mobile station stores associated neighboring cell information associating a plurality of the identified plurality of cells with the first cell in the association based neighbor list.

* * * * *